(12) United States Patent
Yang et al.

(10) Patent No.: US 10,382,482 B2
(45) Date of Patent: *Aug. 13, 2019

(54) POLYMORPHIC OBFUSCATION OF EXECUTABLE CODE

(71) Applicant: Shape Security, Inc, Mountain View, CA (US)

(72) Inventors: Siying Yang, Cupertino, CA (US); Jarrod Overson, Santa Clara, CA (US); Ben Vinegar, San Francisco, CA (US); Bei Zhang, Mountain View, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/756,557

(22) PCT Filed: Aug. 30, 2016

(86) PCT No.: PCT/US2016/049357
§ 371 (c)(1),
(2) Date: Feb. 28, 2018

(87) PCT Pub. No.: WO2017/040453
PCT Pub. Date: Mar. 9, 2017

(65) Prior Publication Data
US 2018/0248913 A1 Aug. 30, 2018

Related U.S. Application Data

(63) Continuation of application No. 14/841,013, filed on Aug. 31, 2015, now Pat. No. 9,807,113.

(51) Int. Cl.
*H04L 29/06* (2006.01)
*G06F 21/56* (2013.01)
*G06F 21/54* (2013.01)

(52) U.S. Cl.
CPC .......... *H04L 63/1483* (2013.01); *G06F 21/54* (2013.01); *G06F 21/56* (2013.01); *H04L 63/1466* (2013.01)

(58) Field of Classification Search
None
See application file for complete search history.

(56) References Cited

U.S. PATENT DOCUMENTS 6,938,170 B1* 8/2005 Kraft .................. G06F 17/3089
707/999.005
8,170,020 B2 5/2012 Oliver
(Continued)

FOREIGN PATENT DOCUMENTS

GB 2443093 A 4/2008
WO WO2000/72119 11/2000
(Continued)

OTHER PUBLICATIONS

CTNF, mailed on Feb. 17, 2017, re: Siying Yang, U.S. Appl. No. 15/235,909, filed Aug. 12, 2016.
(Continued)

*Primary Examiner* — Kaveh Abrishamkar
(74) *Attorney, Agent, or Firm* — Wei & Sleman LLP

(57) ABSTRACT

This document generally relates to systems, method, and other techniques for identifying and interfering with the operation of computer malware, as a mechanism for improving system security. Some implementations include a computer-implemented method by which a computer security server system performs actions including receiving a request for content directed to a particular content server system; forwarding the request to the particular content server system; receiving executable code from the particular content server system; inserting executable injection code into at least one file of the executable code; applying a security countermeasure to the combined executable code and (Continued)

executable injection code to create transformed code; and providing the transformed code to a client computing device.

23 Claims, 6 Drawing Sheets

(56) References Cited

U.S. PATENT DOCUMENTS

| | | |
|---|---|---|
| 8,601,064 B1 | 12/2013 | Liao |
| 8,806,627 B1 | 8/2014 | Aharoni |
| 8,869,281 B2 | 10/2014 | Call |
| 8,892,687 B1 | 11/2014 | Call |
| 8,904,279 B1 | 12/2014 | Bougon |
| 8,954,583 B1 | 2/2015 | Zhou |
| 9,003,511 B1 * | 4/2015 | Yang ................ G06F 21/55 726/13 |
| 9,075,990 B1 * | 7/2015 | Yang ................ G06F 21/55 |
| 9,112,900 B1 * | 8/2015 | Peacock .......... G06F 17/2247 |
| 9,225,729 B1 | 12/2015 | Moen |
| 9,225,737 B2 | 12/2015 | Call |
| 9,241,004 B1 | 1/2016 | April |
| 9,275,222 B2 | 3/2016 | Yang |
| 9,294,502 B1 | 3/2016 | Benishti |
| 9,325,734 B1 * | 4/2016 | Peacock .......... G06F 17/2247 |
| 9,356,954 B2 | 5/2016 | Zhou |
| 9,438,625 B1 * | 9/2016 | Yang ................ H04L 63/1441 |
| 9,479,526 B1 * | 10/2016 | Yang ................ H04L 63/1433 |
| 9,479,529 B2 * | 10/2016 | Yang ................ G06F 21/55 |
| 9,609,006 B2 | 3/2017 | Call |
| 9,807,113 B2 * | 10/2017 | Yang ................ H04L 63/1483 |
| 2002/0016918 A1 | 2/2002 | Tucker |
| 2002/0188631 A1 | 12/2002 | Tiemann |
| 2003/0005129 A1 | 1/2003 | Scheinkman |
| 2003/0159063 A1 | 8/2003 | Apfelbaum |
| 2005/0010764 A1 | 1/2005 | Collet |
| 2005/0278626 A1 | 12/2005 | Malik |
| 2006/0212932 A1 | 9/2006 | Patrick |
| 2007/0074227 A1 | 3/2007 | Naidu |
| 2007/0245027 A1 | 10/2007 | Ghosh |
| 2008/0250310 A1 | 10/2008 | Chen |
| 2009/0007243 A1 | 1/2009 | Boodaei |
| 2009/0077383 A1 | 3/2009 | de Monseignat |
| 2009/0144829 A1 | 6/2009 | Grigsby |
| 2009/0193513 A1 | 7/2009 | Agarwal |
| 2009/0204820 A1 | 8/2009 | Brandenburg |
| 2009/0216882 A1 | 8/2009 | Britton |
| 2009/0249310 A1 | 10/2009 | Meijer |
| 2009/0282062 A1 | 11/2009 | Husic |
| 2009/0292791 A1 | 11/2009 | Livshits |
| 2010/0100927 A1 | 4/2010 | Bhola |
| 2010/0180346 A1 | 7/2010 | Nicolson |
| 2010/0235636 A1 | 9/2010 | Cohen |
| 2010/0240449 A1 | 9/2010 | Corem |
| 2010/0257354 A1 | 10/2010 | Johnston |
| 2010/0262780 A1 | 10/2010 | Mahan |
| 2011/0015917 A1 | 1/2011 | Wang |
| 2011/0107077 A1 | 5/2011 | Henderson |
| 2011/0154473 A1 | 6/2011 | Anderson |
| 2011/0178973 A1 | 7/2011 | Lopez |
| 2011/0225234 A1 | 9/2011 | Amit |
| 2011/0255689 A1 | 10/2011 | Bolotov |
| 2011/0296391 A1 | 12/2011 | Gass |
| 2012/0022942 A1 | 1/2012 | Holloway |
| 2012/0124372 A1 | 5/2012 | Dilley |
| 2012/0198528 A1 | 8/2012 | Baumhof |
| 2012/0254727 A1 | 10/2012 | Jain |
| 2013/0031037 A1 | 1/2013 | Brandt |
| 2013/0232578 A1 | 9/2013 | Chevallier-Mames |
| 2014/0189499 A1 * | 7/2014 | Gigliotti ................ G06F 21/84 715/236 |
| 2014/0281535 A1 | 9/2014 | Kane |
| 2014/0282872 A1 | 9/2014 | Hansen |
| 2014/0283069 A1 | 9/2014 | Call |
| 2014/0289830 A1 | 9/2014 | Lemaster |
| 2014/0379902 A1 | 12/2014 | Wan |
| 2015/0163201 A1 | 6/2015 | Call et al. |
| 2015/0341385 A1 | 11/2015 | Sivan |
| 2016/0080515 A1 | 3/2016 | Kruglick |
| 2016/0142438 A1 | 5/2016 | Pastore |
| 2016/0182537 A1 | 6/2016 | Tatourian |
| 2016/0191351 A1 | 6/2016 | Smith |
| 2016/0212101 A1 | 7/2016 | Reshadi |
| 2016/0342793 A1 | 11/2016 | Hidayat |
| 2016/0359901 A1 | 12/2016 | Yang |
| 2017/0012960 A1 | 1/2017 | Idika |
| 2017/0063923 A1 | 3/2017 | Yang |
| 2017/0118241 A1 | 4/2017 | Call |
| 2017/0201540 A1 | 7/2017 | Call |
| 2018/0144133 A1 | 5/2018 | Hoover |
| 2018/0152436 A1 | 5/2018 | Yang |
| 2018/0212993 A1 | 7/2018 | Call |
| 2018/0248913 A1 | 8/2018 | Yang |
| 2018/0309729 A1 | 10/2018 | Call |
| 2019/0140835 A1 | 5/2019 | Moen |

FOREIGN PATENT DOCUMENTS

| | | |
|---|---|---|
| WO | WO2002/093369 | 11/2002 |
| WO | WO2010/046314 | 10/2010 |
| WO | WO2013091709 | 6/2013 |
| WO | WO 2017/007936 | 1/2017 |
| WO | WO/2017/040453 | 3/2017 |
| WO | PCT/US2016/049357 | 3/2018 |

OTHER PUBLICATIONS

NOA, mailed on Feb. 16, 2017, re: Justin D. Call, U.S. Appl. No. 14/822,287, filed Aug. 10, 2015.
NOA, mailed on Mar. 2, 2017, re: Justin D. Call, U.S. Appl. No. 14/930,198, filed Nov. 2, 2015.
CTNF, mailed on Nov. 30, 2016, re: Siying Yang, U.S. Appl. No. 14/841,013, filed Aug. 31, 2015.
NOA, mailed on Mar. 10, 2017, re: Roger S. Hoover, U.S. Appl. No. 14/470,082, filed Aug. 27, 2014.
CTNF, mailed on Mar. 10, 2017, re: Justin D. Call, U.S. Appl. No. 14/922,436, filed Oct. 26, 2015.
NOA, mailed on Mar. 16, 2017, re: Siying Yang, U.S. Appl. No. 15/052,951, filed Feb. 25, 2016.
CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
NOA, mailed on Jun. 19, 2015, re: Justin Call, U.S. Appl. No. 14/055,583, filed Oct. 16, 2013.
CTNF, mailed on Dec. 24, 2013, re: Justin Call, U.S. Appl. No. 14/055,646, filed Oct. 16, 2013.
CTFR, mailed on May 27, 2014, re: Justin Call, U.S. Appl. No. 14/055,646, filed Oct. 16, 2013.
NOA, mailed on Aug. 12, 2014, re: Justin Call, U.S. Appl. No. 14/055,646, filed Oct. 16, 2013.
NOA, mailed on Sep. 4, 2014, re: Justin Call, U.S. Appl. No. 14/055,646, filed Oct. 16, 2013.
CTFR, mailed on Apr. 9, 2015, re: Justin Call, U.S. Appl. No. 14/055,704, filed Oct. 16, 2013.
CTNF, mailed on Dec. 4, 2014, re: Justin Call, U.S. Appl. No. 14/055,704, filed Oct. 16, 2013.
CTNF, mailed on Dec. 30, 2013, re: Justin Call, U.S. Appl. No. 14/055,704, filed Oct. 16, 2013.
CTFR, mailed on Apr. 22, 2014, re: Justin Call, U.S. Appl. No. 14/055,704, filed Oct. 16, 2013.
CTFR, mailed on Sep. 25, 2015, re: Marc Hansen, U.S. Appl. No. 14/055,714, filed Oct. 16, 2013.
CTNF, mailed on Mar. 16, 2015, re: Marc Hansen, U.S. Appl. No. 14/055,714, filed Oct. 16, 2013.
NOA, mailed on Jan. 13, 2016, re: Marc Hansen, U.S. Appl. No. 14/055,714, filed Oct. 16, 2013.

(56) References Cited

OTHER PUBLICATIONS

NOA, mailed on Jan. 25, 2016, re: Justin Call, U.S. Appl. No. 14/099,437, filed Dec. 6, 2013.
NOA, mailed on Aug. 3, 2015, re: Justin Call, U.S. Appl. No. 14/099,437, filed Dec. 6, 2013.
CTNF, mailed on Jun. 10, 2014, re: Xiaoming Zhou, U.S. Appl. No. 14/159,374, filed Jan. 20, 2014.
NOA, mailed on Sep. 25, 2014, re: Xiaoming Zhou, U.S. Appl. No. 14/159,374, filed Jan. 20, 2014.
NOA, mailed on Nov. 10, 2014, re: Xiaoming Zhou, U.S. Appl. No. 14/159,374, filed Jan. 20, 2014.
CTNF, mailed on Apr. 10, 2014, re: Oscar Steele, U.S. Appl. No. 14/160,105, filed Jan. 21, 2014.
NOA, mailed on Oct. 17, 2014, re: Oscar Steele, U.S. Appl. No. 14/160,105, filed Jan. 21, 2014.
NOA, mailed on Aug. 19, 2015, re: Daniel Moen, U.S. Appl. No. 14/160,107, filed Jan. 21, 2014.
CTFR, mailed on Nov. 6, 2014, re: Justin Call, U.S. Appl. No. 14/160,126, filed Jan. 21, 2014.
CTNF, mailed on May 23, 2014, re: Justin Call, U.S. Appl. No. 14/160,126, filed Jan. 21, 2014.
NOA, mailed on Feb. 20, 2015, re: Justin Call, U.S. Appl. No. 14/160,126, filed Jan. 21, 2014.
NOA, mailed on May 27, 2014, re: Justin Call, U.S. Appl. No. 14/175,923, filed Feb. 7, 2014.
NOA, mailed on Sep. 11, 2014, re: Justin Call, U.S. Appl. No. 14/175,923, filed Feb. 7, 2014.
NOA, mailed on Oct. 15, 2014, re: Justin Call, U.S. Appl. No. 14/175,923, filed Feb. 7, 2014.
CTNF, mailed on Jan. 20, 2016, re: Shishir K. Ramam, U.S. Appl. No. 14/259,869, filed Apr. 23, 2014.
NOA, mailed on Jun. 21, 2016, re: Shishir K. Ramam, U.S. Appl. No. 14/259,869, filed Apr. 23, 2014.
CTFR, mailed on Apr. 20, 2016, re: Xinran Wang, U.S. Appl. No. 14/286,324, filed May 23, 2014.
CTNF, mailed on Aug. 31, 2015, re: Xinran Wang, U.S. Appl. No. 14/286,324, filed May 23, 2014.
CTFR, mailed on Dec. 2, 2015, re: Xinran Wang, U.S. Appl. No. 14/286,733, filed May 23, 2014.
CTNF, mailed on May 27, 2015, re: Xinran Wang, U.S. Appl. No. 14/286,733, filed May 23, 2014.
CTFR, mailed on Jan. 23, 2015, re: Xinran Wang, U.S. Appl. No. 14/286,733, filed May 23, 2014.
CTNF, mailed on Jul. 14, 2014, re: Xinran Wang, U.S. Appl. No. 14/286,733, filed May 23, 2014.
NOA, mailed on May 4, 2016, re: Xinran Wang, U.S. Appl. No. 14/286,733, filed May 23, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
CTNF, mailed on Oct. 9, 2014, re: Siying Yang, U.S. Appl. No. 14/321,172, filed Jul. 1, 2014.
NOA, mailed on Mar. 30, 2015, re: Siying Yang, U.S. Appl. No. 14/321,172, filed Jul. 1, 2014.
NOA, mailed on Oct. 12, 2016, re: Siying Yang, U.S. Appl. No. 14/329,718, filed Jul. 11, 2014.
NOA, mailed on Aug. 15, 2016, re: Siying Yang, U.S. Appl. No. 14/329,718, filed Jul. 11, 2014.
CTFR, mailed on May 6, 2016, re: Siying Yang, U.S. Appl. No. 14/329,718, filed Jul. 11, 2014.
CTNF, mailed on Feb. 3, 2016, re: Siying Yang, U.S. Appl. No. 14/329,718, filed Jul. 11, 2014.
CTFR, mailed on Feb. 20, 2015, re: Siying Yang, U.S. Appl. No. 14/329,718, filed Jul. 11, 2014.
CTNF, mailed on Oct. 30, 2014, re: Siying Yang, U.S. Appl. No. 14/329,718, filed Jul. 11, 2014.
NOA, mailed on Sep. 15, 2015, re: Siying Yang, U.S. Appl. No. 14/329,718, filed Jul. 11, 2014.
NOA, mailed on Nov. 3, 2016, re: Siying Yang, U.S. Appl. No. 14/329,718, filed Jul. 11, 2014.
NOA, mailed on Jan. 18, 2017, re: Siying Yang, U.S. Appl. No. 14/329,718, filed Jul. 11, 2014.
CTNF, mailed Sep. 30, 2014, re: Siying Yang, U.S. Appl. No. 14/338,207, filed Jul. 22, 2014.
NOA, mailed on Nov. 7, 2014, re: Siyinq Yang, U.S. Appl. No. 14/338,207, filed Jul. 22, 2014.
NOA, mailed on Jan. 6, 2015, re: Siying Yang, U.S. Appl. No. 14/338,207, filed Jul. 22, 2014.
CTNF, mailed on Jun. 24, 2016, re: Roger Hoover U.S. Appl. No. 14/470,082, filed Aug. 27, 2014.
CTNF, mailed on Aug. 28, 2015, re: Roger Hoover, U.S. Appl. No. 14/470,082, filed Aug. 27, 2014.
CTNF, mailed on Dec. 1, 2016, re: Oscar Steele, U.S. Appl. No. 14/481,663, filed Sep. 9, 2014.
NOA, mailed on Apr. 27, 2016, re: Siying Yang, U.S. Appl. No. 14/481,835, filed Sep. 9, 2014.
CTNF, mailed on Oct. 28, 2015, re: Siying Yang, U.S. Appl. No. 14/481,835, filed Sep. 9, 2014.
NOA, mailed on May 24, 2016, re: Siying Yang, U.S. Appl. No. 14/481,835, filed Sep. 9, 2014.
NOA, mailed on Jul. 25, 2016, re: Siying Yang, U.S. Appl. No. 14/481,835, filed Sep. 9, 2014.
CTNF, mailed on Apr. 8, 2016, re: Ariya Hidayat, U.S. Appl. No. 14/481,867, filed Sep. 9, 2014.
CTFR, mailed on Sep. 6, 2016, re: Ariya Hidayat, U.S. Appl. No. 14/481,867, filed Sep. 9, 2014.
NOA, mailed on Dec. 16, 2016, re: Ariya Hidayat, U.S. Appl. No. 14/481,867, filed Sep. 9, 2014.
CTNF, mailed on Jan. 2, 2015, re: Timothy Peacock, U.S. Appl. No. 14/503,346, filed Sep. 30, 2014.
NOA, mailed on Apr. 10, 2015, re: Timothy Peacock, U.S. Appl. No. 14/503,346, filed Sep. 30, 2014.
CTNF, mailed on Dec. 14, 2015, re: Oscar Steele, U.S. Appl. No. 14/542,994, filed Nov. 17, 2014.
NOA, mailed on Mar. 28, 2016, re: Oscar Steele, U.S. Appl. No. 14/542,994, filed Nov. 17, 2014.
CTFR, mailed on Dec. 28, 2016, re: Siying Yang, U.S. Appl. No. 14/570,466, filed Dec. 15, 2014.
CTNF, mailed on Apr. 21, 2016, re: Siying Yang, U.S. Appl. No. 14/570,466, filed Dec. 15, 2014.
CTNF, mailed on Apr. 22, 2016, re: Justin Call, U.S. Appl. No. 14/602,038, filed Jan. 21, 2015.
NOA, mailed on Sep. 19, 2016, re: Justin Call, U.S. Appl. No. 14/602,038, filed Jan. 21, 2015.
NOA, mailed on Mar. 16, 2016, re: Xiaoming Zhou, U.S. Appl. No. 14/618,389, filed Feb. 10, 2015.
NOA, mailed on Apr. 12, 2016, re: Xiaoming Zhou, U.S. Appl. No. 14/618,389, filed Feb. 10, 2015.
CTFR, mailed on Jan. 15, 2016, re: Xiaoming Zhou, U.S. Appl. No. 14/618,389, filed Feb. 10, 2015.
CTNF, mailed on Oct. 5, 2015, re: Xiaoming Zhou, U.S. Appl. No. 14/618,389, filed Feb. 10, 2015.
CTFR, mailed on Mar. 30, 2016, re: Siying Yang, U.S. Appl. No. 14/679,596, filed Apr. 6, 2015.
CTNF, mailed on Nov. 4, 2015, re: Siying Yang, U.S. Appl. No. 14/679,596, filed Apr. 6, 2015.
NOA, mailed on Jul. 18, 2016, re: Siying Yang, U.S. Appl. No. 14/679,596, filed Apr. 6, 2015.
CTFR, mailed on May 19, 2016, re: Justin Call, U.S. Appl. No. 14/702,140, filed May 1, 2015.
CTNF, mailed on Oct. 23, 2015, re: Justin Call, U.S. Appl. No. 14/702,140, filed May 1, 2015.
CTFR, mailed on Jul. 15, 2016, re: Justin Call, U.S. Appl. No. 14/702,349, filed May 1, 2015.
CTNF, mailed on Feb. 1, 2016, re: Justin Call, U.S. Appl. No. 14/702,349, filed May 1, 2015.
NOA, mailed on Oct. 24, 2016, re: Justin Call, U.S. Appl. No. 14/702,349, filed May 1, 2015.
CTNF, mailed on Oct. 7, 2016, re: Roger Hoover, U.S. Appl. No. 14/713,493, filed May 15, 2015.

(56) References Cited

OTHER PUBLICATIONS

CTNF, mailed on Nov. 10, 2016, re: Nwokedi Idika, U.S. Appl. No. 14/728,621, filed Jun. 2, 2015.
NOA, mailed on Oct. 23, 2015, re: Siying Yang, U.S. Appl. No. 14/790,738, filed Jul. 2, 2015.
CTNF, mailed on Jul. 18, 2016, re: Justin Call, U.S. Appl. No. 14/822,287, filed Aug. 10, 2015.
CTNF, mailed on Oct. 19, 2016, re: Justin Call, U.S. Appl. No. 14/929,019, filed Oct. 30, 2015.
NOA, mailed on Nov. 9, 2016, re: Justin Call, U.S. Appl. No. 14/930,198, filed Nov. 2, 2015.
CTNF, mailed on Jul. 21, 2016, re: Justin Call, U.S. Appl. No. 14/930,198, filed Nov. 2, 2015.
CTFR, mailed on Sep. 9, 2016, re: Siying Yang, U.S. Appl. No. 14/968,460, filed Dec. 14, 2015.
CTNF, mailed on Apr. 8, 2016, re: Siying Yang, U.S. Appl. No. 14/968,460, filed Dec. 14, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTNF, mailed on Oct. 7, 2016, re: Siying Yang, U.S. Appl. No. 15/052,951, filed Feb. 25, 2016.
NOA, mailed on Mar. 29, 2017, re: Siying Yang, U.S. Appl. No. 15/052,951, filed Feb. 25, 2016.
NOA, mailed on Apr. 11, 2017, re: Siying Yang, U.S. Appl. No. 15/052,951, filed Feb. 25, 2016.
CTNF, mailed on Dec. 16, 2016, re: Marc Hansen, U.S. Appl. No. 15/148,139, filed May 6, 2016.
CTFR, mailed on Feb. 6, 2017, re: Xiaoming Zhou, U.S. Appl. No. 15/157,704, filed May 18, 2016.
CTNF, mailed on Oct. 6, 2016, re: Xiaoming Zhou, U.S. Appl. No. 15/157,704, filed May 18, 2016.
NOA, mailed on Mar. 7, 2017, re: Xiaoming Zhou, U.S. Appl. No. 15/157,704, filed May 18, 2016
CTNF, mailed on May 22, 2017, re: Siying Yang, U.S. Appl. No. 14/329,718, filed Jul. 11, 2014.
NOA, mailed on May 22, 2017, re: Roger S. Hoover, U.S. Appl. No. 14/713,493, filed May 15, 2015.
NOA, mailed on Jun. 7, 2017, re: Call, et al., U.S. Appl. No. 14/930,198, filed Jun. 7, 2017.
CTNF, mailed on Jun. 2, 2017, re: Ariya Hidayat, U.S. Appl. No. 15/224,978, filed Aug. 1, 2016.
NOA, mailed on Jun. 30, 2017, re: Roger S. Hoover, U.S. Appl. No. 14/713,493, filed May 15, 2015.
CTNF, mailed on May 25, 2017, re: Daniel G. Moen, U.S. Appl. No. 14/980,231, filed Dec. 28, 2015.
CTFR, mailed on Jun. 6, 2017, re: Siying Yang, U.S. Appl. No. 15/235,909, filed Aug. 12, 2016.
NOA, mailed on Jun. 20, 2017, re: Roger S. Hoover, U.S. Appl. No. 14/470,082, filed Aug. 27, 2014.
NOA, mailed on Jul. 13, 2017, re: Xinran Wang, U.S. Appl. No. 14/286,324, filed May 23, 2014.
NOA, mailed on Jun. 27, 2017, re: Siying Yang, U.S. Appl. No. 14/841,013, filed Aug. 31, 2015.
NOA, mailed on Jun. 20, 2017, re: Siying Yang, U.S. Appl. No. 15/052,951, filed Feb. 25, 2016.
CTNF, mailed on Jul. 28, 2017, re: Xinran Wang, U.S. Appl. No. 15/230,540, filed Aug. 8, 2016.
NOA, mailed on Aug. 4, 2017, re: Justin Call, U.S. Appl. No. 14/929,019, filed Oct. 30, 2015.
CTFR, mailed on Aug. 14, 2017, re: Marc R. Hansen, U.S. Appl. No. 15/148,139, filed May 6, 2016.
CTNF, mailed on Aug. 11, 2017, re: Oscar H. Steele III, U.S. Appl. No. 15/224,985, filed Aug. 1, 2016.
NOA, mailed on Aug. 29, 2017, re: Siying Yang, U.S. Appl. No. 15/052,951, filed Feb. 25, 2016.
NOA, mailed on Aug. 29, 2017, re: Roger S. Hoover, U.S. Appl. No. 14/713,493, filed May 15, 2015.
CTNF, mailed on Aug. 30, 2017, re: Justin D. Call, U.S. Appl. No. 15/470,715, filed Mar. 27, 2017.
CTNF, mailed on Aug. 30, 2017, re: Justin D. Call, U.S. Appl. No. 15/470,715, filed Aug. 19, 2017.
CTFR, mailed on Oct. 5, 2017, re: Justin D. Call, U.S. Appl. No. 14/922,436, filed Oct. 26, 2015.
NOA, mailed on Oct. 11, 2017, re: James D. Call, U.S. Appl. No. 14/822,287, filed Aug. 10, 2015.
NOA, mailed on Oct. 18, 2017, re: Roger S. Hoover, U.S. Appl. No. 14/470,082, filed Aug. 27, 2014.
NOA, mailed on Oct. 10, 2017, re: Roger S. Hoover, U.S. Appl. No. 14/713,493, filed May 15, 2015.
CTNF, mailed on Oct. 6, 2017, re: Wesley Hales, U.S. Appl. No. 14/849,459, filed Sep. 9, 2015.
CTNF, mailed on Nov. 13, 2017, re: Nwokedi Idika, U.S. Appl. No. 14/728,596, filed Jun. 2, 2015.
NOA, mailed on Jan. 9, 2018, re: Justin D. Call, U.S. Appl. No. 15/470,715, filed Mar. 27, 2017.
NOA, mailed on Jan. 16, 2018, re: Justin D. Call, U.S. Appl. No. 14/822,287, filed Aug. 10, 2015.
CTNF, mailed on Feb. 7, 2017, re: Daniel G. Moen, U.S. Appl. No. 14/980,231, filed Dec. 28, 2015.
NOA, mailed on Mar. 14, 2018, re: Justin Call, U.S. Appl. No. 14/929,019, filed Oct. 30, 2015.
CTNF, mailed on May 3, 2018, re: Marc R. Hansen, U.S. Appl. No. 15/148,139, filed May 6, 2016.
CTFR, mailed on Apr. 9, 2018, re: Siying Yang, U.S. Appl. No. 15/242,062, filed Aug. 19, 2016.
CTFR, mailed on May 10, 2018, re: Nwokedi Idika, U.S. Appl. No. 14/728,596, filed Jun. 2, 2015.
CTFR, mailed on Jun. 6, 2018, re: Oscar H. Steele III, U.S. Appl. No. 15/224,985, filed Aug. 1, 2016.
CTNF, mailed on Jul. 12, 2018, re: Justin D. Call, U.S. Appl. No. 14/922,436, filed Oct. 26, 2015.
NOA, mailed on Aug. 13, 2018, re: Daniel G. Moen, U.S. Appl. No. 14/980,231, filed Dec. 28, 2015.
NOA, mailed on Sep. 5, 2018, re: Daniel G. Moen, U.S. Appl. No. 14/980,231, filed Dec. 28, 2015.
CTNF, mailed on Sep. 10, 2018, re: Roger S. Hoover, U.S. Appl. No. 15/805,114, filed Nov. 6, 2017.
NOA, mailed on Sep. 19, 2018, re: Nwokedi Idika, U.S. Appl. No. 15/204,710, filed Jul. 7, 2016.
NOA, mailed on Oct. 24, 2018, re: Marc R. Hansen, U.S. Appl. No. 15/148,139, filed May 6, 2016.
CTNF, mailed on Nov. 16, 2018, re: Siying Yang, U.S. Appl. No. 15/756,557, filed Feb. 28, 2018.
NOA, mailed on Nov. 27, 2018, re: Nwokedi Idika, U.S. Appl. No. 15/204,710, filed Jul. 7, 2016.
CTNF, mailed on Dec. 19, 2018, re: Oscar H. Steele III, U.S. Appl. No. 15/224,985, filed Aug. 1, 2016.
EP App. No. 147302293, Intention to Grant, EP, Call et al., dated May 23, 2017.
Examination Report No. 1 for Standard Patent Application, App. No. 2014237025, AU, Call, Justin D, dated Sep. 25, 2014.
In-the-wire authentication: Protecting client-side critical data fields in secure network transactions, Jan. 14, 2009.
WebShield: Enabling various web defense techniques without client side modifications, Feb. 6, 2011.
Detecting and Preventing Drive-By Download Attack via Participative Monitoring of the Web, Jul. 23, 2013.
Design and Implementation of a Distributed Virtual Machine for Networked Computers, 1999.
On-the-fly web content integrity check boosts users' confidence, Nov. 1, 2002.
International Preliminary Report on Patentability, dated Jun. 16, 2016, PCT/US14/68133.
International Search Report, dated Apr. 7, 2015, PCT/US14/68133.
International Search Report, dated Jul. 28, 2015, PCT/US15/31361.
International Search Report, dated Apr. 9, 2015, PCT/US15/12072.
International Preliminary Report on Patentability, dated Nov. 30, 2015, PCT/US15/12072.

(56) References Cited

OTHER PUBLICATIONS

International Search Report, dated Jan. 21, 2015, PCT/US14/23635.
International Search Report, dated Dec. 30, 2016, PCT/US16/53392.
International Search Report, dated Nov. 21, 2016, PCT/US16/49357.
International Search Report, dated Oct. 11, 2016, PCT/US16/41337.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
Collection of articles regarding HTML DOM, all available online as of Dec. 21, 2014, 7 pages, Dec. 21, 2014.
CTFR, dated Mar. 28, 2019, re: Roger S. Hoover, U.S. Appl. No. 15/805,114, filed Nov. 6, 2017.
NOA, dated Mar. 25, 2019, re: Siying Yang, U.S. Appl. No. 15/756,557, filed Feb. 28, 2018.
CTFR, dated Jun. 7, 2019, re: Siying Yang, U.S. Appl. No. 15/242,062, filed Aug. 19, 2016.

\* cited by examiner

POLYMORPHIC OBFUSCATION OF EXECUTABLE CODE

TECHNICAL FIELD

This document relates to systems and techniques for identifying and interfering with the operation of computer malware, as a mechanism for improving computer system security.

BACKGROUND

Computer malware in the form of bots and other malicious software and hardware is a serious problem for commercial and non-commercial organizations that have a presence on the World Wide Web. For example, malicious parties may develop software that surreptitiously installs itself on the computers of unsuspecting users and monitors their interaction with their computers to improper ends. For example, malware that performs a so-called "Man in the Middle" or "Man in the Browser" attack may be installed on a user's computer, may monitor the user's actions, and may appear to the user as legitimate software—such as code downloaded to a browser by the user's bank. Such malware is able to then present a mock login page to cause the user to supply his or her credentials (e.g., account number and password), and may then use those intercepted credentials to route money out of the user's account and into the fraudster's account.

SUMMARY

This document describes systems and techniques by which web code (e.g., HTML, CSS, and JavaScript) is modified by intermediate systems located between a Web server system (or other type of server system) that originally serves content, and the client that has requested the content. The intermediate system may be located at a variety of locations along the path of the served content, including adjacent to the content server system and adjacent a requesting client, or at the "top" of a network serving the client or the server.

Each such intermediate system may re-code the served content as it is served downward, so that the content is harder to exploit by malware at a client or at some intermediate point between the server and the client. Each intermediate system may cause responses from the client to be "worded" in terms of re-coded descriptors that would confuse an upstream system, and thus each intermediate system may also re-code (reverse transcode) such client requests in a manner that is inverse to that of the re-coding that it performed during the serving of the code. In this manner, the re-coding at lower levels will provide additional security for the upper levels, but will be invisible to the upper systems so that the upper systems do not have to take active steps to deal with it. The devices or services for performing such re-coding may be placed at arbitrary locations in the overall network, and may appear at multiple positions along the path of content that is being served, so that, in effect, the devices can be vertically "stacked," either coordinated or not, and not necessarily requiring one device to know that another device in the path exists.

One manner in which the content can be re-coded, or transcoded, is by identifying portions of the content that do not affect the manner in which the content is presented to and interacts with a user, such as names of functions and other objects that are not displayed. Such names can be transcoded into essentially random strings, and will not "break" the code as long as they are translated consistently—e.g., so that if the name of a function is changed, all calls to the function are changed in the same manner so that all the pieces of code still fit together. A variety of other transcodings may also be applied across the content (and across the various files in the content in a consistent manner). Then, to the extent a request that comes back from the client includes one of the transcoded names, the relevant intermediate system may transcode it back into the name it had when the content was served down to the intermediate system. The manner in which the names or other elements are transcoded may be different for each serving of the content (the content may be served polymorphically), so that malware cannot readily learn how the transcoding is occurring—i.e., the transcoding creates a moving target for the malware.

Another manner in which the content can be re-coded is by identifying portions of the content at which injection code can be inserted without affecting the manner in which the content is presented to or interacts with a user at a client device that presents the content (e.g., a personal computer executing a web browser). The injection code is referred to as such because it is code that is in addition to the code needed to perform the functionality of the main code (e.g., to generate a web page with which a user can interact) and is added into, or injected into, the regular code. In certain implementations, the injection code can be in files separate from the "normal" code needed to make the page functional. In others, the injection code can be in the same file as code for the page, such as JavaScript code, and can be located in a block separate from the normal code or can be intermingled (e.g., line by line) with the normal code. The injection code can then be marked or otherwise mapped so that it can be identified on the client device and be executed while skipping over the normal code (and the normal code can be executed while skipping over the injection code). For example, each line of the injection code can be flagged such as with a comment tag or other relevant tag that can be identified by an application running on the client device.

The injection code may be placed in-line in regular files with originally-served code from a Web server system, and may perform a variety of functions. For example, the injection code may be dummy code that does not perform meaningful operations so that when the client executes the injection code, the user's experience is not altered. To that end, the injected code may serve as a distraction to any malware that is attempting to analyze or interact with the Web code. In a similar manner, the injection code may alternatively or additionally do something that is invisible to a user of a client, and that actively serves as a distraction to any malware (i.e., here, the distraction is operation of the code, where the prior example used the mere presence of the code as a distraction). For example, executing the injection code may cause the client to make a dummy request that, when received by the intermediate system, returns any data required to ensure that the injection code executes properly and does not affect the content, though the injection code may simply throw away whatever data it receives in return. As an additional approach, the injection code can replace executable code (e.g., JavaScript) originally in the web page with executable code that performs functionally what the original JavaScript did, but with different code and polymorphically (e.g., because the original JavaScript was not easy to perform substitutions into, and thus would not work well polymorphically—so that the injection code solves a problem of using the original code with a polymorphic security system). And in yet another example, non-JavaScript or other non-executable code may be replaced with JavaScript or similar executable code that functions in the same way as the original JavaScript code, but is harder for malware to exploit.

Similar to transcoding, the manner in which the injection code is inserted, or the injection code itself, may be different for each serving of the content (where each serving involves multiple different transcodings for different servings, but not that every single serving be different from every other single serving), so that the malware cannot readily learn how the injection code is inserted. Where the injection code differs for each serving or at least for different servings, the obfuscation created by the injection of the code may be considered to occur at "run-time," in contrast to injection code that is added to the normal code once (at "build-time", and then the combined code is simply fetched and served in response to multiple requests (though perhaps with recoding each time using mechanisms separate from the insertion of injection code)

The injection code can be layered, in that the injection code may be inserted multiple times and in multiple locations for a particular piece of content along its path from the originating server system to the consuming client—e.g., by security devices on the client side of the Internet and on the server side of the Internet. The layering can occur without explicit coordination between the layers. In particular, an operator of the Web server system may insert injection code and may serve the code across the Internet. A system operated by an ISP for its customers, by a corporation for its employees, or by a single at-home router serving a single home can insert additional injection code based on its own respective analysis. The second layer of inserting injection code can use the same algorithms, and even the same model of hardware as the earlier injection code insertion. The second layer may insert injection code into the injection code of the first layer. So long as the second layer's injection code does not affect content or the injection code of the first layer, the user's experience should not change.

Inserting injection code and transcoding may be performed alone or combined when protecting content. The injection code inserting and the transcoding can occur at different locations along the content's path from the originating server system to the consuming client. The injection code inserting and the transcoding can occur without explicit coordination between the layers performing the inserting and the transcoding. In particular, an operator of the Web server system may insert injection code and may serve the code across the Internet. A system operated by an ISP can transcode the original content and the injection code. Inserting the injection code and transcoding may occur in the opposite order. Similar principles apply to layering the only transcoding operations or inserting injection code. The transcoding should not affect the execution of the injection code, and inserting the injection code should not affect the transcoding.

Some implementations of the techniques described herein include a computer-implemented method. The method can include receiving, at a computer security server system located between the Internet and a client computing device that makes requests over the Internet, a request for content directed to a particular content server system. The received request can be forwarded, by the computer security server system, to the particular content server system. In response to the request, executable code can be received from the particular content server system. Executable injection can be inserted into the executable code to create combined code. The executable injection code may be programmed so as to not (i) alter, from a user's perspective, an execution of the received executable code, and to not (ii) perform actions observable by the user. A security countermeasure can be applied to the combined code to create transformed code, and the transformed code can be provided to the client computing device.

These and other implementations can include one or more of the following features.

The executable code can be included in a file that is received from the content server system. Inserting the executable injection code can include inserting the injection code into the file at multiple different locations separated by lines of the executable code in the file.

A request to execute the injection code can be received from the client computing device.

The injection code, when executed by the client computing device, can determine whether malware is present on the client computing device.

One or more locations can be determined within the received executable code to insert the injection code for the injection code to not (i) alter, from the user's perspective, the execution of the received executable code or (ii) perform actions observable by the user.

Applying a security countermeasure to the combined code to create transformed code can include renaming one or more variables or functions of the combined code.

A request can be received from the client computing device to execute a portion of the transformed code that corresponds to the received code. The received executable code can be determined that corresponds to the portion of the transformed code.

In response to receiving a second request for the content, the injection code can be inserted into the executable code at one or more locations different than a location at which the executable code was previously inserted into the executable code.

A map can be periodically updated that defines where, in the executable code, the executable injection code will be inserted when served to a requesting client computing device.

Some implementations of the techniques described herein can include a computing system. The computing system can include one or more computers and one or more storage devices storing instructions that are operable, when executed by the one or more computers, to cause performance of operations. The operations can include: receiving, at the computing system, a request for content directed to a particular content server system, wherein the computing system is located between the Internet and a client computing device that makes requests over the Internet; forwarding, by the computing system, the received request to the particular content server system; in response to the request, receiving, from the particular content server system, executable code; inserting into the executable code, and to create combined code, executable injection code that, when executed by the client computing device, does not (i) alter, from a user's perspective, an execution of the received executable code or (ii) perform actions observable by the user; applying a security countermeasure to the combined code to create transformed code; and providing the transformed code to the client computing device.

Some implementations of the techniques described herein can include one or more computer-readable devices, which may be non-transitory, storing instructions that, when executed by one or more computer processors, cause performance of operations. The operations can include receiving, at a computer security server system located between the Internet and a client computing device that makes requests over the Internet, a request for content directed to a particular content server system; forwarding, by the computer security server system, the received request to the particular content server system; in response to the request, receiving, from the particular content server system, executable code; inserting into the executable code, and to create combined code, executable injection code that, when executed by the client computing device, does not (i) alter, from a user's perspective, an execution of the received executable code or (ii) perform actions observable by the user; applying a security countermeasure to the combined code to create transformed code; and providing the transformed code to the client computing device.

These and other implementations can optionally include one or more of the following advantages. For example, a server of content may provide functionality at the client to protect its served content and the user who requested the served content, such as from a bot that has surreptitiously overtaken the user's computer or web browser. Such injected code can be hidden to make it harder for the illegal party to identify that security measures have been introduced to the content, and thus, the "good guys" are more likely to block the malware's actions, catch the malware, and/or learn things about the malware.

DESCRIPTION OF DRAWINGS

Like reference symbols in the various drawings indicate like elements.

DETAILED DESCRIPTION

Figure 1A:
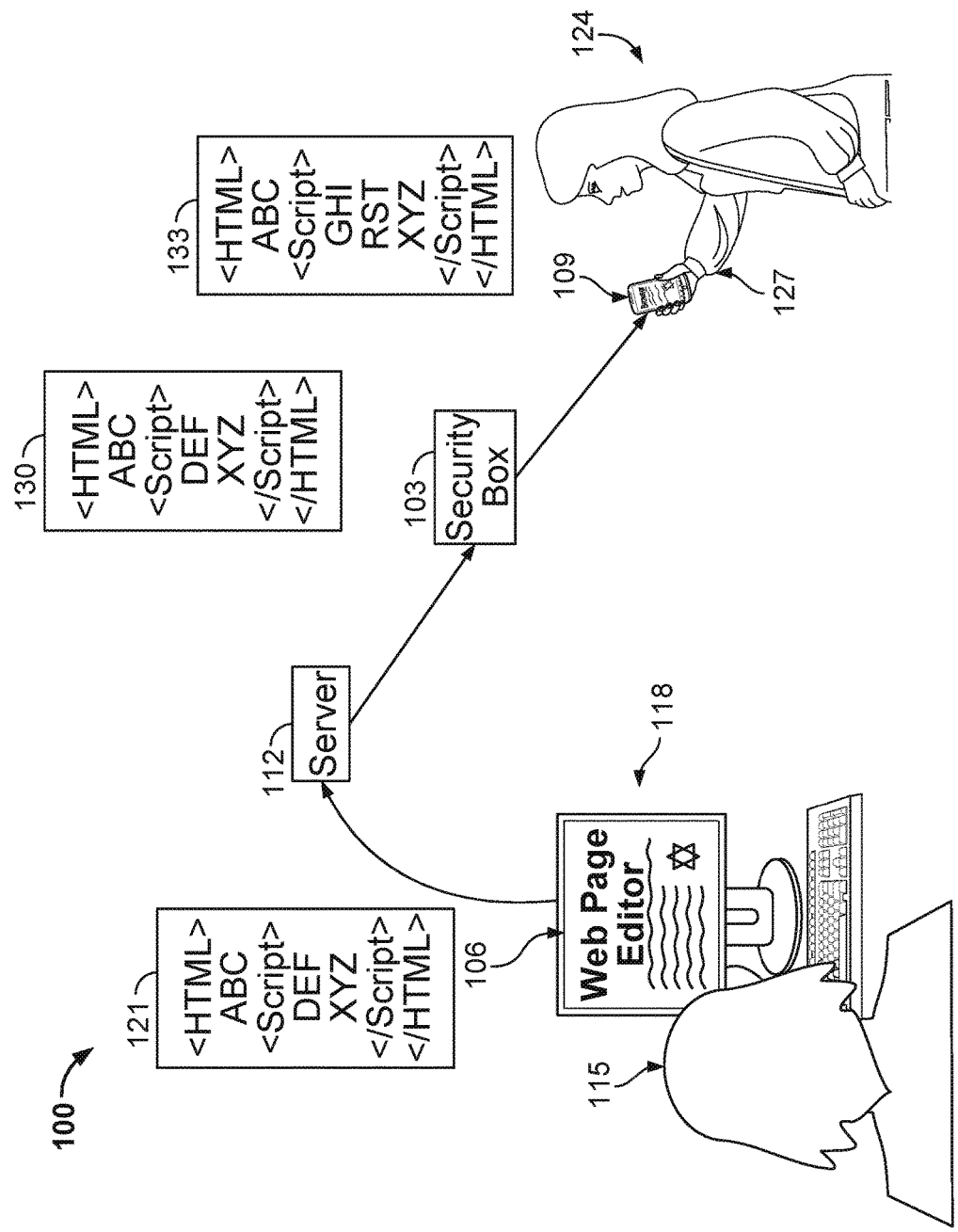
FIG. 1A is a conceptual diagram of a computer security system.

This document describes techniques by which content (e.g., program code in the form of HTML, CSS, and JavaScript) that is served by a variety of Web server systems may be transcoded, and additional code can be injected into the content before it reaches a client that requested the content. Such transcoding and injection may be performed to obfuscate the manner in which the content acts, so as to interfere with attempts by malware to interact with the content and exploit it. The transcoding may be performed in a different manner each time that the content is served, so as to create a polymorphic transcoding, and so as to create a moving target for any malware that is attempting to analyze the code. Similarly, additional code that is injected may be injected into a different location and the additional code may be different each time the content is served—a form of obfuscation at run-time for a system, i.e., inserting the injection code around the time the content is requested by a client device, and possibly only in response to such request. The injected code may be executable code such as JavaScript that can be injected to perform a variety of tasks.

For example, the injected code may be dummy code that does not execute (e.g., it may have executable portions but never be called) but that serves as a distraction to manual analysis by a malware operator, or automatic analysis or other interaction by malware.

The injected code may also execute though only as a distraction for the malware, such as by setting variables or passing data to a server and receiving data back, where the data is intended to distract or even mislead malware operating on a client device or elsewhere. In other instances, the injected executing code may replace code that was originally served by a web server system and may be arranged to perform the same functions as that original code. As another example, the injected code may also attach security tokens on subsequent client requests generated based on the transcoded web pages. The security tokens can then be validated on the intermediate security device.

The replacing code may also be placed at scattered locations in the content to be served so as to make it more difficult for malicious organizations or software to determine and exploit the operation of the code. One example simply places the injection code with other code of the same type (such as with executable code of the same type), such as in a particular JavaScript file that is served to a client device. The injection code may be in a block at a single location in the JavaScript file, or may be scattered through the JavaScript file and intermingled (e.g., a line at a time) with the "normal" code (the code form the Web server needed to render a page properly) in the JavaScript file. In other examples, some of the injection code can be in files for executable (e.g., JavaScript) code and other injection code can be in files for non-executable code (e.g., HTML), and the different portions of the code may be gather on the client and then executed together.

The transcoding and injection may occur at various different locations along the path of the content being served, and in certain implementations, may occur multiple times at different points along the path of the code be served (including one or more times on the server side of the Internet and one or more times on the client side of the Internet). For example, an organization that serves the content may be interested in transcoding the content and injecting additional code so as to prevent malware from stealing credentials of users who subscribe to the organization, such as users who perform online banking or who purchase goods online through a retail organization. In contrast, an Internet Service Provider (ISP) may wish to perform its own transcoding and code injection, both to protect the Internet from malware that may be lurking among its subscribers, and to prevent the use of malware which may unnecessarily put a load on the network of the ISP, and also hurt the reputation of the ISP as being an above-board provider of services. A corporation may wish to perform transcoding and code injection for reasons similar to that of the ISP, and more particularly, to be able to identify particular compromised client devices within the organization and remove compromising software from those devices. Further down the path of serving the code, individual residential routers may transcode the code and inject additional code that is being served so as to prevent improper interaction of computers within a user's home with the code. Such routers may have been provided by an ISP or other Internet-providing organization, and distributing such transcoding out to the last mile may be beneficial in more readily deflecting and detecting malware activity. Also, for the other organizations described above, detection of malware may also be a goal for purposes of identifying compromised client devices and gathering data for fighting against evolving malware activity, where the data may be processed at a certain level in the serving chain, or may be aggregated at a higher level for more complete and powerful processing.

FIG. 1A is a conceptual diagram of a computer security system 100. In general, the system 100 shows a complete network system with a security box 103 located in the system 100. The security box 103 may be programmed to provide both malware deflection and malware detection capabilities. Although referenced as a box here for simplicity, the security box 103 may take a variety of forms, including both physical and virtual forms. For example, the security box 103 may be actual rack-mounted special-purpose hardware that may be inserted into a network. Alternatively, the security box 103 may be software or firmware that is incorporated into a device, such as an Internet router, that performs additional activities. In yet other implementations, the security box 103 may be virtualized within a data center, such as by being provided in a "software as a service" (SaaS) offering by a security services company, to a variety of organizations that serve content over the Internet.

In this example, the client devices 106 and 109 are connected to the server 112 through the Internet. In actual implementation, the server 112 may be more than a single computing device. Also, multiple different content server systems would be involved, including banking server systems, online retailer server systems, and other systems of organizations that want to prevent malware activity from interfering with their users and the data that they serve to their users. Placed between the server 112 and client device 109 is the security box 103. The security box 103 may be placed physically and/or logically between the server 112 and the Internet. The security box 103 may thus intercept requests made to the server 112 and intercept responses made by the server 112.

The user 115 (e.g., a computer programmer) develops content 118 that is stored on the server 112 to be provided by the server 112 to requesting client devices. The content 118 may be represented by code 121 that when displayed on the client device 106 displays an interface 118, and the code 121 may be executable code. The code 121 may include HTML, Javascript, CSS, and similar web code. The code 121 may include various scripts that include one or more functions. In the example shown, the script is shown by the letters DEF and XYZ.

The server 112 receives a request from the client device 109 that is being operated by user 124. When the server 112 receives the request from the client device 109, the server 112 provides the code 130 to the client device 109. The code 130 is identical or closely identical to the code 121 that was provided by the user 115. Before the code 130 reaches the client device 109, the security box 103 intercepts the code 130. Depending on the placement of the security box 103, the security box 103 may intercept the code 130 before or after the code 130 reaches the Internet.

Once the security box 103 intercepts the code 130, the security box 103 may perform a number of operations on the code 130. The security box 103 may add injection code that, when executed by the client device 109, does not perform any operation. The security box 103 may add additional code that when executed by the client device 109 performs an operation, but the operation is invisible to the user 124. The security box 103 may replace the code 130 with injection code so that the injection code, when executed by the client device 109 performs the same operations as the code 130. Any of these changes by the security box 103 may occur in a polymorphic manner such that any time the client device 109 or any other devices request the code 130, the security box 103 may perform a different operation that results in different changes to the code 130.

In more detail, the security box 103 may add injection code to the client device 109. The injection code is illustrated in modified code 133 with the addition of RST. In this example, the injection code is code that is executed by the client device 109, but does not perform any operation, or is not executed because the code is placed at a location that it will not be reached (e.g., it is not called by other code). To not perform any operation, the client device may execute the injection code and the additional code may be a NOP, or no operation. If the injection code is a function call that requests data from another computing device, then when the client device transmits the function call, the security box 103 intercepts the function call and recognizes the function call as injection code that does not perform an operation. The security box 103 may then transmit data to the client device 109 that performs no operation. The user 124 may be unaware of the injection code because the user 124 sees the same content 127 on the client device 109 that user 115 created on client device 106

In another example, the injection code may be code that performs an operation that was not performed by the initial code 130 but that is invisible to the user 124. An operation that is invisible to the user may be an operation that adds zero to a number, multiples a number by one, a function that accepts an input and outputs the input, or any other operation on some data that does not change that data. Other examples of invisible operation are an operation that collects client browser activity (e.g., for reporting back to a central location) and an operation that changes served content in a client browser after the content is rendered. An operation that is invisible to the user may also check for malware running on the client device 109. If the injection code is a function call that requests data from another computing device, then when the client device 109 transmits the function call, the security box 103 intercepts the function call and recognizes the function call as injection code that performs an operation invisible to the user. The security box 103 may then transmit data to the client device 109 that, when executed by the client device, performs an operation that is invisible to the user.

In yet another example, the injection code may replace some of the code 121. As illustrated in the example in FIG. 1, the code 133 that the security box 103 provides to the client device 109 contains a line of code GHI that corresponds to the code DEF of code 130. The security box 103 replaced the code DEF with GHI that performs functionality that is identical to DEF (at least as viewed by a user 124). The security box 103 may analyze the code 130 to identify portions of the code 130 that may be replaced with new code that performs the same functionality. When the client device 109 executes the code 133, the code that replaced the original code performs the same function such that the content 127 displayed by the client device 109 is the same as if the client device executed code 130.

While the example shown in FIG. 1 illustrates the security box 103 modifying the script portion of the code 130, the security box 103 may also modify the other portion of the code such as the HTML. The security box 103 may inject code into the HTML portion of the code 130. The injected code may perform no operation or perform an operation that is invisible to the user. Such invisible operation may be one that simply changes background operations that are not display related, or may be operations that are display-related, but are not discerned by a user because they are overlaid with other content, displayed in the code but not actually because they are off an edge of a visible display that the user is viewing, or displayed in an area so small that an ordinary user would not discern it. In some implementations, the injected code may be a different type of code than the code the injected code is replacing or being woven into. For example, the security box may inject a script into HTML code or replace HTML code with a script.

After providing code 133 to the client device, the security box may continuously monitor the code 130 for changes. The changes may include new code added to the code 130 or new code that replaces some of the code 130. The changes may originate from the user 115 who is editing the content 118 or from another source. To detect a change in the code, the security box may hash the changed code and compare the hash of the changed code to a hash of the code 130. If the hashes do not match, then the security box 103 may perform a deeper analysis of the changed code to identify the changes and determine whether new or additional injection code should be added. Another technique to detect a change in the code is for the security box 103 to compare document object models (DOMs) of the changed code to the code 130. Another technique to detect a change in the code is for the security box 103 to dispatch a crawler to the server 112 to identify any updates to the code 130. Alternatively, the security box 103 may recognize that some of the injected code may not be performing as intended. The security box 103 may add additional code to the code 130 that monitors on the client device 109 the execution of the code 133. If the additional code determines that the code 133 is not executing as intended, then the security box 103 may reanalyze the changed code.

Figure 1B:
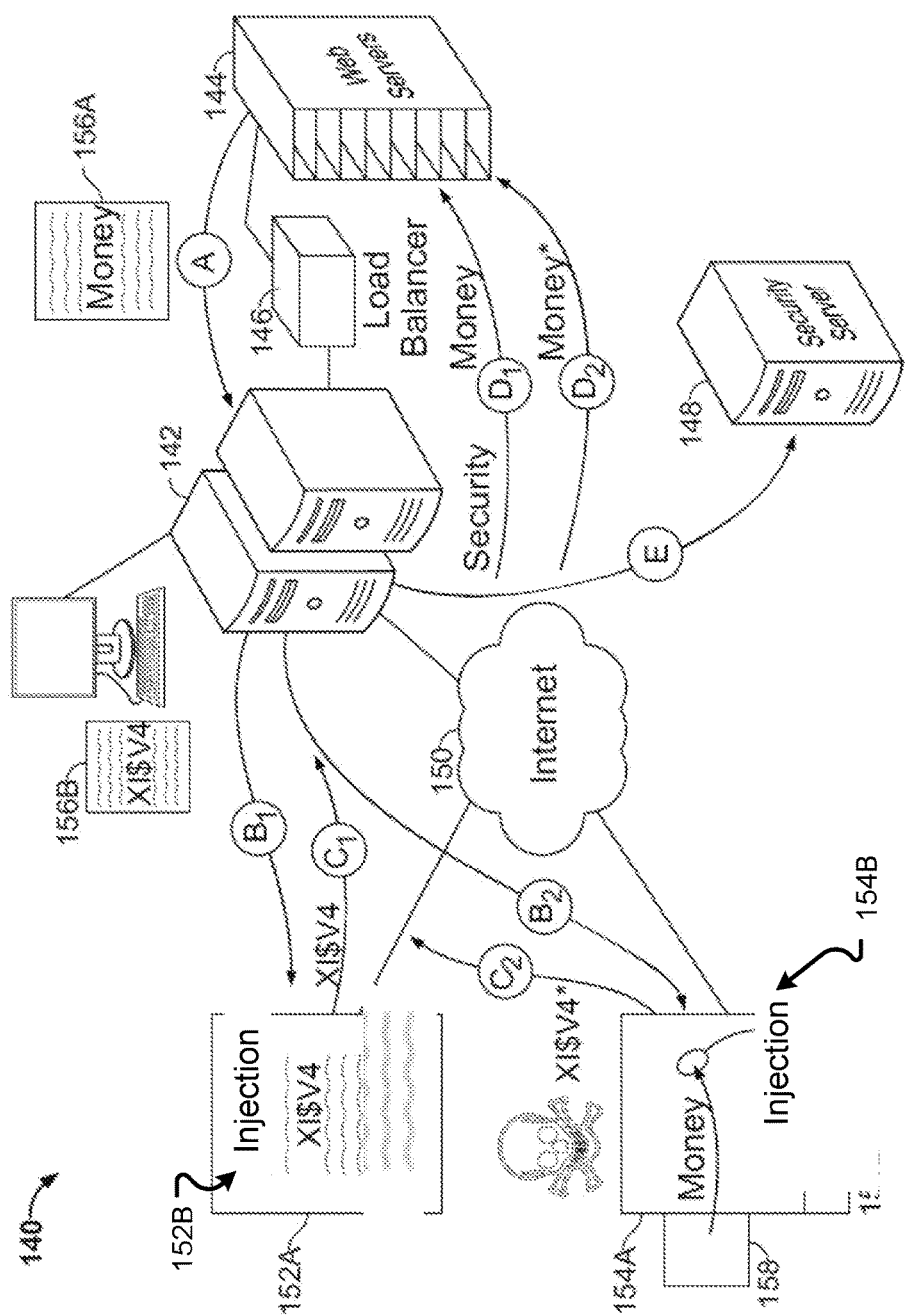
FIG. 1B is a schematic diagram of a transcoding and code injection subsystem that can be used in a system like that shown in FIG. 1A.

FIG. 1B is schematic diagram of a transcoding and code injection subsystem that can be used in a system like that shown in FIG. 1A. In particular, different entities at different levels of servers, including server 112 and other servers not illustrated, in the system 100 of FIG. 1A may be able to deploy systems like that shown here to carry out a number of different isolated or coordinated countermeasures against malware. In this example, a web server 144 responds to a request from client devices 152 and 154 for an electronic resource. The web server 144 accesses or generates the resource, which in the example is a web page 156A relating to a financial transaction. For instance, the web server 144 may serve an online banking site, www.examplebank.com. The web page 156A may provide HTML or similar forms for account holders at the client devices 152 and 154 to institute an electronic wire transfer. The forms may include fields that allow the account holders to indicate a source account, a destination account, and the amount to transfer. The web page 156A may implement the form with HTML tags such as <form> and <input> tags that are each identified by a name. For instance, the destination account field is named "money_dest." The client devices 152 and 154 can use the names in submitting form data to the web server 144 through a GET or POST HTTP request method, for example.

Before the system 140 transmits the web page 156A (or more precisely, code that when rendered or otherwise executed by a browser application, generates the web page 156A) over the internet 150 and to each of the client devices 152 and 154, the web page 156A is directed to the security intermediary 142. The load balancer 146 may determine which security intermediary 142 to direct the web page 156A to in implementations where there may be multiple, redundant security intermediaries 142. Though one security intermediary 142 is shown here, multiple intermediaries may be placed by the entity that operates the web server 144 (either directly or through contract with a third party security service provider).

A policy engine at the security intermediary 142 may determine how the security intermediary 142 will process the web page 156A. For example, the policy engine may determine that the web page 156A, which pertains to sensitive financial transactions, is part of a resource family that the intermediary 142 has been configured to modify and for which it is to insert injection code. The injection code may take a variety of forms. For example, the injection code may be code that is served with the original code from a Web server system, and that (a) monitors activity on the client device, including by identifying characteristics of the client device (e.g., operating system type and version, hardware configuration, browser type and version, browser plug ins, etc.) and identifying a manner in which a user interacts with the device so as to, for example, determine whether the user is a human or a bot); and (b) monitors interaction of third-party code with the served code, such as determining that third-party code has made a call to the served code using a name that has been transcoded, thus indicating that the third-party code is not aware of the transcoding, and might be malware. The injection code may also be code that is inserted right into the original code, and rather than monitoring for malware activity, it actually acts to deflect such malware activity. For example, the injected code may be code that does not function but serves as a distraction to malware, or it may be code that performs the functions of some original code that it replaced, but does so in a more secure manner.

Other resources from the banking site, such as its homepage, may contain less sensitive information and may be subject to lower-level security policies such that the security intermediary 142 may handle the homepage with less sensitivity than the wire transfer webpage 156A. The policy engine may be programmed to operate differently depending on the location in the network at which the intermediary 142 is located—e.g., a policy engine for an intermediary at an ISP may implement different countermeasure policies than does a similar intermediary operating at a server site. In addition, the code may be annotated with parameters that are not implemented by a browser (e.g., that are coded into comments) but that can be read by the security intermediary 142 to determine the sort or level of security measures that the intermediary 142 should impose on the content.

At steps B1 and B2, the security intermediary 142 processes the web page 156A according to the governing security policy and transmits processed webpage 156B to client devices 152 and 154 (where the client devices 152 and 154 with or without the content also passing through another security intermediary). First, the security intermediary 142 may modify elements of the webpage's 156A implicit API, such as field names, function names, and link references.

In the example operations of the system 140, the security intermediary 142 changes the name of the destination account field in web page 156A from "money_dest" to "x1$v4." The name change obscures the identity of the field to prevent malware 158 from learning how to exploit the field. Moreover, the security intermediary 142 can apply different pseudo-random modifications each time the web page 156A is served to prevent the malware 158 from tracking patterns that the malware 158 could use to exploit the web server 144 or initiate a fraudulent transaction, for example. Other techniques for obscuring content, including obscuring the environment in which web code such as JavaScript operates, are discussed further herein.

The change can also occur according to an "analyze once, transcode many" approach. In particular, the security intermediary 142 may analyze content for a page the first time the page passes through it. Such analysis may result in the intermediary 142 creating a map or template that identifies locations in the content, e.g., via flags or pointers, where changes in the content will be made—certain common pointers pointing to multiple locations where the same change needs to be made across the content. The map or template may then be saved, and if a subsequent request is made for the content, the system may simply insert relevant content where the pointers point, without a need to repeat the analysis, which can be relatively computationally expensive.

In addition to transcoding the served content itself, the security intermediary 142 can insert injection code into the content that can perform operations that are invisible to an end user. As noted above, the injection code may be intermingled with existing code (e.g., both existing executable code (e.g., JavaScript) and existing non-executable code (e.g., HTML), such that the existing code (at least the executable form) and the injection code are executed at the same time by client device 152 or 154. For example consecutive lines of intermingled code may include one line of original code, followed by one line of injection code, followed by one line of original code. The injection code may perform operations that are invisible to the user such as detecting certain activity that may indicate alien content (e.g., malware 158 or legitimate code on a client device 152 or 154 that interacts with a web page, such as a browser plug-in), and can report the detected activity back to the security intermediary 142 and/or a central security server 148. The injection code may also not perform any operation.

After intermingling the injection code and the existing code, the security device will obfuscate the intermingled code (injection and existing) together, so that it's much more difficult to reverse engineer than obfuscating them separately. Such obfuscation may involve converting names of functions and other elements to different names consistently across all the code, as described more fully below.

As also mentioned above, injection code may also collect information about particular activity that occurs on the client device 152 and/or 154. For instance, the injection code may collect information about how a user interacts with the web page such as keystrokes, mouse movements, changes in focus between particular forms, fields, or frames, and patterns and timing of interactions with the page. Information about the user's operating environment may also be collected, such as network configurations, operating system information, hardware specifications, performance indicators, session identifiers, other cookies, browser type, browser settings, IP address, MAC address, client device type, plug-ins, screen resolution, installed fonts, timestamp, site or page identifier, GPS data, etc. In some implementations, users and system operators can configure the injection code to restrict or anonymize the data that it gathers to respect user privacy.

The security intermediary 142 can also include an identifier, such as a session identifier in a cookie, with the processed web page 156B content that it transmits. The security intermediary 142 can store the identifier in a data structure, table, or database that correlates the original content with the modified content for a particular resource so that the security intermediary 142 can apply reverse modifications to requests based on modified resources before forwarding the request to the web server 144. For example, the security intermediary 142 may assign a unique identifier to the web page 156A, and store the identifier in a table that associates the resource's original field name, "money_dest," with the modified field name "x1$v4." Later transactions posted to the web server 144 from the modified page 156B can be received by the security intermediary 142 for reverse modification before forwarding the request to the web server 144. The security intermediary 142 can determine which reverse modifications to apply based on the identifier. In some implementations, the identifier can be a session identifier. The identifier may also be passed to a client and stored there (e.g., in a cookie) and then passed back with a request, where the passed cookie may serve as a key to the reverse transformation, so that the security intermediary 142 need not store state information about content it has passed to clients.

The transformations of the resources may occur multiple times on their paths after being served. For example, a security intermediary 142 may first modify a resource at the location of the entity that served the resource, and the first-modified resource may be served over the Internet. A second security intermediary at the home of a user or at a corporation firewall or ISP may then transform the resource a second time before passing it on. Such transformations may occur quickly and without a perceptible delay or with a barely perceptible delay for a user. Also, the transformations may be limited to only particular secure pages (e.g., log in screens or screens for completing financial transactions)

At step C1, client device 152 has received the modified (i.e., processed) web code of web page 1566. Client device 152 is a clean device in that no malware 158 that is configured to attack the online banking website has infected client device 152. A user at the client device 152 provides into the fields on the web page 1566 the necessary information to complete a wire transfer, such as an indication of the source account, destination account, and transfer amount. A user of the client device 152 may then submit the request for a wire transfer, which a browser on the client device 152 converts into an HTTP request to the web server 144, the request including the information submitted by the user along with corresponding field names. The HTTP request from client device 152 uses the random field name that the security intermediary 142 generated for the destination account field, "x1$v4."

Injection code 1526 can monitor the web page 1566 on client device 152. In some implementations, the injection code 152B may determine that malware 158 activity or other anomalous activity has altered the web page 1566 and may be attempting to initiate an unauthorized transaction. For example, the injection code 1526 may include information about the modified web code for web page 1566, and may be programmed to detect when elements of the modified code are altered at the client device 152. For instance, the injection code may determine whether the document object model ("DOM") for the webpage has been altered, or if the HTTP request based on the web page 1566 uses unexpected values that do not correspond to the modified web code delivered in web page 156B. For instance, the instrumentation code may detect that the client device 154 has called an original function value rather than its modified, replaced value. In some implementations, the injection code 152B may not perform any operations.

Malicious activity can be both detected and deflected in relatively sophisticated manners by changing the environment in which executable code on the client device, such as JavaScript, operates. Detection can occur by identifying certain JavaScript operations or calls that may be made on a page, and injection code that is served with a web page so as to report to a security server system when such operations occur and/or such calls are made (along with information that describes the actions). Deflection occurs by the constant changing of code elements as they are served each time, such as changing the names of elements that will be called by malicious JavaScript, so that the malicious code can never catch up with the changes, and thus gives itself away when it tries to interoperate with code known by the system to be stale. As one example, a common method for making changes to a DOM for a web page is the document.write method, and may be used by malicious code to surreptitiously change what the user of a computing device sees on a web page.

A security system can (1) inject served code corresponding to such a method so that the injection code reports calls to the method, and additionally includes data that characterizes such calls, so that the system can detect abnormal activity and perhaps use the additional data to determine whether the abnormal activity is malicious or benign; and (2) change the function name to "document.#3@1*87%5.write" or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be injected and continually changed include "getElementById," "getElementByName," XPath commands, and setting of HTML elements in the DOM to particular values.

The complexity for the malware can increase even more when the code is transformed multiple times and code is injected multiple by different subsystems along a path as it is being served to a client. If the malware can determine how the "closest" security system obfuscated the content, it still will not obtain the original content that it can analyze. Rather, the malware will then need to reverse engineer the first level of analysis also. Each such attempt to interact with the content both creates more trouble for the malware, and also increases the chance that the malware will instigate activity that tips its hand, and can be identified by injection code or otherwise.

As injection code executes on the client devices 152, 154, the code may collect information that characterizes events and statuses of a web page or other resource as described, and may report the information in various manners. In some implementations, the information can be sent to the security server 148 and/or the security intermediary 142. The security server 148 may receive reports directly from the client devices 152, 154, or indirectly through the security intermediary 142. The injection code may generate and transmit reports periodically or upon request. Reports can also be transmitted in subsequent HTTP requests from the client device 152, 154 to the web server 144, and can be received by the security intermediary 142. Alternatively or in addition to these techniques, reports can be sent to the security intermediary 142 or security server 148 asynchronously, such as through the use of AJAX or WebSockets.

Multiple different security management systems at different levels in the network may receive such reports, and the data sent to the different levels may be the same or different. For example, a security system at a LAN level may obtain information sufficient to characterize certain anomalous behavior and to locate the client device on which it has occurred. A security system further up the network (e.g., one operated by a company that provides security services and hardware to a wide variety of customers) may receive similar information that characterizes the anomalous behavior and also information that characterizes the client device, though in an anonymized manner. The additional information may include, for example, information about the hardware model and type, operating system, and browser used on the device, so that the central security system can more readily identify that certain emerging malware threats are appearing first under a particular operating system, or identify other relevant information about an outbreak.

At step C1, malware 158 has not interfered with the transaction, and the HTTP request includes the appropriate modified field names such as "x1$v4" for the "money_dest" field. Therefore, the injection code 152B does not report the presence of anomalous or malicious activity to the security intermediary 142.

At step C2, client device 154 is shown to have received the modified (i.e., processed) web code for web page 156B. Unlike client device 152, however, client device 154 is compromised with malware 158, such as a man-in-the-browser bot. When a user of the compromised client device 154 submits the wire-transfer transaction, the malware 158 may intervene and replace the destination account field name with "money_dest"—the original field name before the security intermediary 142 modified web page 156A. The bot may use the original field name, for example, based on previous analysis of the banking website, by it or its fraudulent organization, in instances where the security intermediary 142 did not modify the field name.

The injection code 154B can detect the behavior or consequences of the behavior of malware 158, and generate a report to alert the security intermediary 142 and/or the web server 144 of suspicious activity. The injection code 154B in FIG. 1B, for example, reports the suspicious activity by causing the HTTP request that the user submits for the transaction to include the field name "x1$v4*" in place of the malware's 158 field name "money_dest." The asterisk appended to the end of the modified field name indicates that the injection code 154B detected suspicious activity.

At steps D1 and D2, the security intermediary 142 receives the HTTP requests for the wire-transfer transaction from client devices 152 and 154, decodes the requests, and forwards the decoded requests to the web server 144. The HTTP requests from the client devices 152 and 154 may include a cookie having a session identifier that the security intermediary 142 can use in decoding the HTTP requests. The security intermediary 142 can use the data from the cookie as a translation decoding key or can look up the session identifier in a translation table, and decode the request by applying reverse modifications that restore the original field and function names, for example. With respect to the request that the intermediary 142 receives from the clean client device 152, the intermediary 142 receives the substitute field name "x1$v4" as expected, decodes the field name by replacing it with "money_dest" and forwards the request to the web server 144 through the load balancer 146. The operation of security intermediary 142 is transparent to the web server 144, and the web server 144 can process the transaction according to the user's request.

With respect to the HTTP request from the compromised client device 154, the security intermediary 142 recognizes the report of suspicious activity by injection code 154, and sends an alert to the web server 144. The security intermediary 142 can use the session identifier in the HTTP request to determine the appropriate reverse modifications necessary to decode the request. The security intermediary 142 may recognize that the field name "x1$v4*" corresponds to the original "money_dest" field name, but that the injection code 1546 appended an asterisk to the field name to indicate possibly malicious activity.

The security intermediary 142 can respond to the indication in various ways according to the applicable security policy and/or system configuration settings. In one example shown in step D2, the intermediary 142 forwards the decoded request to the web server 144, but appends the asterisk to the destination account field name, "money_dest*," to notify the web server 144 that the transaction is suspicious, and may indicate the presence of unauthorized alien content. In response, the web server 144 may ignore the alert, complete the transaction and log the alert, refuse to complete the transaction, pretend to complete the transaction, and/or take other appropriate action. In some implementations, the security intermediary 142 may not forward the transaction request to the web server 144 if suspicious activity has been detected.

When transformation has occurred at multiple levels in the serving, the first intermediary to receive a request or a report from instrumentation code can report the activity to a central system. Also, where injection code has been added by a first intermediary, the second intermediary may recognize the presence of the injection code and leave it alone so that it continues to report back to the system that created it. The second intermediary may also alter the injection code slightly so that reports from the instrumentation code are copied to it also. In some implementations, the second intermediary may configure the second level of injection code to perform no operation so that the second level of injection code does not interfere with the first. The second intermediary may also recognize when the first level of injection code does not perform any operation and then inject a second level of injection code that monitors for malware.

At step E, the security intermediary 142 may forward information about the transactions between the web server and the client devices 152 and/or 154 to the security server 148 (or multiple different security servers operated by different entities). For example, the security intermediary 142 may share information about the transaction from client device 154 in which the instrumentation code 154B reported suspicious activity.

The injection code 154B may include a report about the detected suspicious activity and its circumstances that the security intermediary 142 can provide to the security server 148. For example, the report may include information about the client device 154, the abnormal or suspicious activity, the electronic resources and fields involved, and information about the browser, operating system, or other application that the malware 158 may have compromised. Data from the security server 148 can be analyzed with respect to the security intermediary 142 for a particular site, or in aggregate with information from other security intermediaries 142 that serve other websites and web servers 144. The security server 148 can analyze data across multiple computing sessions and for multiple client devices. The analysis from the security server 148 can be used, for instance, to identify new threats, track known threats (e.g., for a corporate-level security system, to ID the particular client device and its physical geographic location), and to distinguish legitimate abnormal or alien activity from malicious activity.

Example of Polymorphic Obfuscation of JavaScript Script: The below example provides an illustration of the manner in which obfuscating JavaScript code can be added to code that is served by a Web server in a manner that differs from one content request to another, so that the JavaScript (potentially in addition to other portions of the content) becomes a moving target for any malicious code, making it harder to analyze the code and also harder to interact maliciously with the code even where analysis has previously occurred.

In this example, the following may be the code for a Web page to be served by a Web server system. The page has one HTML form with two fields, and one native JavaScript:

```
<html>
<body>
    <form action=login.php method=POST>
    <div>
        Username: <input type=text id=fname name=fname>
        Password: <input type=password id=age name=age>
        <input type=submit id=loginButton value=Login>
    </div>
    </form>
    <script>
        var loginButton = document.getElementById('loginButton');
        loginButton.addEventListener('click', function ( ) {
            var firstName = document.getElementbyId("fname");
            alert("Hi" + firstName.value);
        });
    </script>
</body>
```

The following code shows JavaScript injected into the page, where the injected code is shown in italics:

```
<html>
<body>
    <form action=login.php method=POST>
    <div>
        Username: <input type=text id=fname name=fname>
        Password: <input type=password id=age name=age>
        <input type=submit id=loginButton value=Login>
    </div>
    </form>
    <script>
        var loginButton = document.getElementById('loginButton');
        loginButton.addEventListener('click', function ( ) {
            var firstName = document.getElementbyId("fname");
            alert("Hi" + firstName.value);
        });
    </script>
    <script>
        (function ( ){
        function InjectedScript(x,y) {
            this.x = x || 10;
            this.y = y || 10;
        }
        InjectedScript.prototype.getX = function( ) {
            return this.x;
        };
        InjectedScript.prototype.getY =function( ) {
            return this.y;
        };
        InjectedScript.prototype.setX = function(x) {
            this.x = x;
        };
        InjectedScript.prototype.setY = function(y) {
            this.y = y;
        };
        var instance = new InjectedScript(50,100);
        }( ));
    </script>
</body>
</html>
```

That code may be injected at run-time (i.e., at essentially the same time a user requests the underlying Web page, and typically in response to the user requesting the Web page) or earlier. It can subsequently be recoded for purposes of further obfuscation at run-time, and such recoding may be different for different servings of the code, whether in different sessions to the same requesting user device or to different user devices (and may use the analysis and transformation actions described in more detailed below). The following illustrates the code as-obfuscated to be served in response to a first request for the Web resource, such as the Web page and other resources:

```
<html>
<body>
<form action=login.php method=POST>
<div>
    Username: <input type=text id=fname name=fname>
    Password: <input type=password id=age name=age>
    <input type=submit id=loginButton value=Login>
</div>
</form>
<script>
    var loginButton = document.getElementById('loginButton');
    loginButton.addEventListener('click', function ( ) {
    var firstName = document.getElementbyId("fname");
    alert("Hi" + firstName.value);
});
</script>
<script>
    !function( ){function a(a,b){this.x=a||10,this.y=b||10}a.prototype.getX=function( ){
    return this.x},a.prototype.getY=function( ){return
this.y},a.prototype.setX=function(a)
    {this.x=a),a.prototype.setY=function(a){this.y=a},new a(50,100)}( );
</script>
</body>
</html>
```

The following listing illustrates the same code obfuscated in a different manner (polymorphically) in response to a second user request. Every serving of the code may differ from every other serving of the code, or changes may be made periodically, such as every 10 servings of the code, where the periodicity of the changes may be selected to be frequent enough to block reverse engineering of the code by malicious parties, and also be a function of (a) current system load, where changes in the transformation may occur less often when the system is under high loads, and (b) on the security sensitivity of the content, where content that needs higher security may have its recoding changed more often.

In addition to adding injection script to the original, or base, executable code, the techniques here can also mangle the original and injected code to further increase the level of difficulty for malware or operators of malware. Continuing with the example from immediately above, an original page may take the following form:

```
<script>
    var loginButton = document.getElementById('loginButton');
    loginButton.addEventListener('click', function ( ) {
```

```
<html>
<body>
  <form action=login.php method=POST>
  <div>
      Username: <input type=text id=fname name=fname>
      Password: <input type=password id=age name=age>
      <input type=submit id=loginButton value=Login>
  </div>
  </form>
  <script>\
      var loginButton = document.getElementById('loginButton');
      loginButton.addEventListener('click', function ( ) {
      var firstName = document.getElementbyId("fname");
      alert("Hi" + firstName.value);
  });
</script>
<script>
  var
_0xa5da =["\x78","\x79","\x67\x65\x74\x58","\x70\x72\x6F\x74\x6F\x74\x79\x70\x65",
  "\x67\x65\x74\x59","\x73\x65\x74x\x58","\x73\x65\x74\x59"];(function ( ){function
  _0x9b17x1(_0x9b17x2,_0x9b17x3){this[_0xa5da[0]]=_0x9b17x2|| 10;this[_0xa5d
a[1]]=
  _0x9b17x3||10;} ;_0x9b17x1[_0xa5da[3]][_0xa5da[2]]=function ( ){return
this[_0xa5da[0]];
  } ;_0x9b17x1[_0xa5da[3]][_0xa5da[4]]=function ( ){return this[_0xa5da[1]];}
  _0x9b17x1[_0xa5da[3]][_0xa5da[5]]=function
(_0x9b17x2){this[_0xa5da[0]]=_0x9b17x2;};
  _0x9b17x1[_0xa5da[3]][_0xa5da[6]]=function
(_0x9b17x3){this[_0xa5da[1]]=_0x9b17x3;};
  var _0x9b17x4= new _0x9b17x1(50,100);) ( );
  </script>
</body>
</html>
```

```
            var firstName = document.getElementById("fname");
            alert("Hi" + firstName.value);
        });
    </script>
```

The following listing illustrates introduction of inter-mangled scripting code to the original code, where the injection code is shown in italics. Note that in this illustration, no obfuscation has been applied to the original code, though in typical implementations, the original code and the injected code would both be obfuscated along with being inter-mangled so as to make reverse engineering of the code even more difficult.

```
<html>
<body>
<form action=login.php method=POST>
    <div>
        Username: <input type=text id=fname name=fname>
        Password: <input type=password id=age name=age>
        <input type=submit id=loginButton value=Login>
    </div>
</form>
<script>
    var loginButton = document.getElementById('loginButton');
    var _0xa5da = ["x", "y", "getX", "'prototype'",
      "getY", "setX", "setY"
    ];
    loginButton.addEventListener('click', function ( ) {
        var firstName = document.getElementById("fname");
        alert("Hi" + firstName.value);
    });
    (function ( ) {function _0x9b17x1(_0x9b17x2, _0x9b17x3) {this[_0xa5da[0]]
    =_0x9b17x2 || 10;this[_0xa5da[1]] = _0x9b17x3 || 10;};
    _0x9b17x1[_0xa5da[3]][_0xa5da[2]] = function ( ) { return this[_0xa5da[0]]; };
    _0x9b17x1[_0xa5da[3]][_0xe5da[4]] = function( ) {return this[_0xa5da[1]]; };
    _0x9b17x1[_0xa5da[3]][_0xa5da[5]] = function(_0x9b17x2) {this[_0xa5da[0]] =
    _0x9b17x2;};
    _0x9b17x1[_0xa5da[3]][_0xe5da[6]] = function(_0x9b17x3) {this[_0xe5da[1]] =
    _0x9b17x3;};
        var_0x9b17x4 = new_0x9b17x (50, 100);
    }( ));
    </script>
</body>
</html>
```

In these manners, then, the code ultimately served by a system may be recoded by an intermediate security system that may both add injected code (which may function to monitor operation of a client device and report back to a central security service on that operation, and may simply serve to interfere with the ability of malware to take advantage of a system), and may also perform polymorphic obfuscation on the original code to which the injected code is added.

Figure 2:
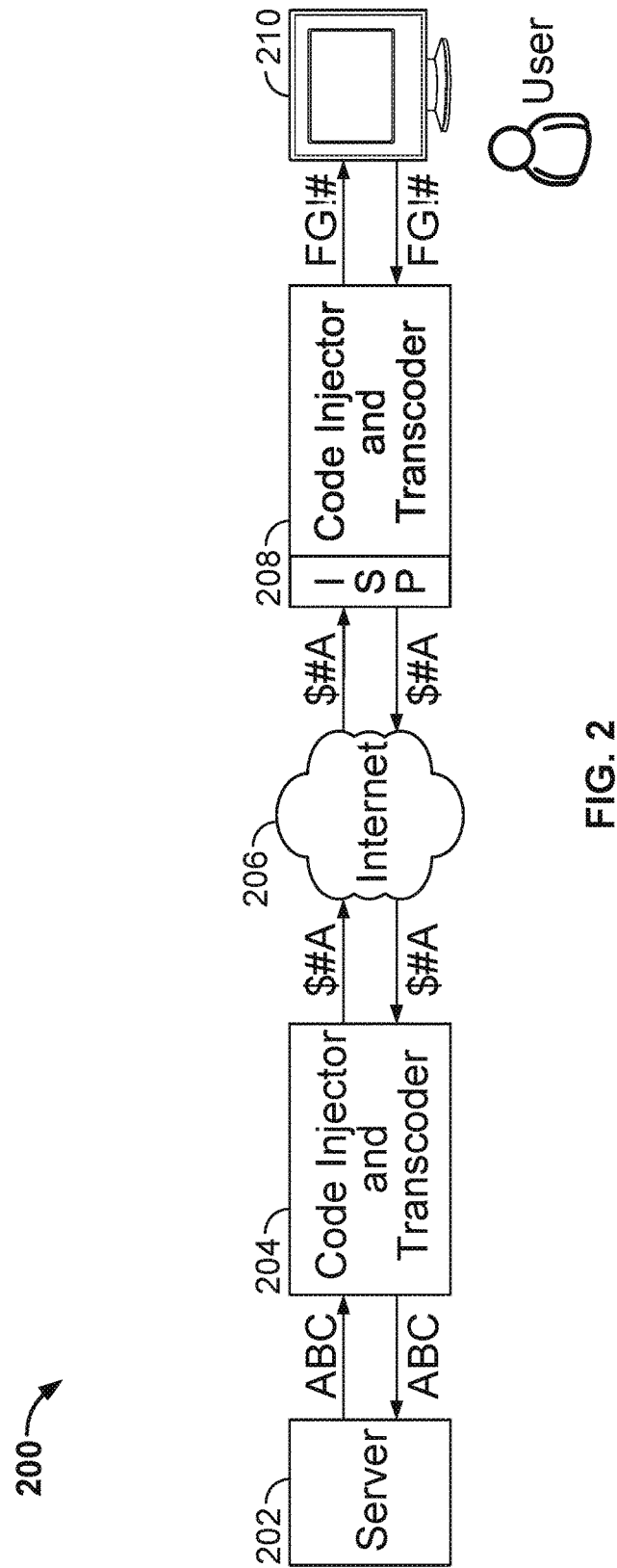
FIG. 2 shows a conceptual flow of information through a distributed multi-layer computer security system.

FIG. 2 shows a conceptual flow of information through a distributed multi-layer computer security system. In general, what is shown is a single serving and request transaction between a client device 210 and a server system 202 by which security systems in the path between the client device 210 and the server system 202 operate to impose security countermeasures on the content that is served and on the request from the client device 210. The example here is directed mainly at showing how multiple stacked levels of content transformation may be employed in such a system as those described in FIGS. 1A and 1B.

The system 200 shown here includes a server system 202 communicating through the Internet 206 with a client device 210, where such communication may occur by typical mechanisms such as a Web server system communicating with a Web browser that makes requests to the Web server system. The client device 210 communicates with the Internet through an Internet service provider (ISP) in a conventional manner. For example, the server system 202 may be operated by a bank with which a user of the client device 210 does business, and the user may navigate his or her web browser to a website of the bank in order to perform online banking, such as to transfer funds from one bank account to another.

In this example, the bank has purchased a code injector and transcoder 204 (e.g., the security intermediary 142 of FIG. 1B) and situated it between its server system 202 and the Internet 206. The code injector and transcoder 204 may perform polymorphic transformations on code and inject code that the bank server system 202 serves, and may perform reverse transformations and process injected code on requests coming back from the client device 210. For example, in this case, the bank website transmits a string in the form of the letters ABC, which would be transmitted along with many other forms of content such as additional code that includes a script. The code injector and transcoder 204 may determine that the string is part of a function name or other part of content that can be altered without affecting the manner in which the content is displayed to the user on client device 210. As a result, the code injector and transcoder 204 may replace all instances of the string function name ABC with the random characters $#A, which it then transmits through Internet 206 to the ISP. Code injector and transcoder 204 may also perform a number of other, additional transformations on the content before transmitting it. The code injector and transcoder 204 may also inject code into the script. The code injector and transcoder 204 may analyze the script to determine locations within the script where code may be injected and not alter the operation of the script. The injected code may not perform any operations or may perform operations that are invisible to the user such as monitoring for malware.

The ISP may have purchased its own example of a code injector and transcoder 208 to provide additional security countermeasures for any content that it serves, where such content may come from an organization that has its own transcoder or from organizations that do not have transcoders. In this example, the code injector and transcoder 208 may analyze the code and recognize that the string $#A is a function name that they can be changed without affecting the manner in which the code is displayed on the client device 210. As a result, the code injector and transcoder 208 changes that string to a different string, FG!#, everywhere that the string appears in the code. The ISP then forwards the transcoded content to the client device 210. The code injector and transcoder 208 may also analyze the code and in particular the script portion of the code. The code injector and transcoder 208 may determine locations within the script where code may be injected and not alter the operation of the script. The injected code may not perform any operations or may perform operations that are invisible to the user such as monitoring for malware. These operations may be independent of the operations performed by executing the injected code from the code injector and transcoder 208.

Requests from the client device 210 back to the server system 202 generally operate in the inverse manner from that just described. For example, if a user makes a selection of content associated with a variable name or function name, that variable name or function name may be embedded in a request, such as in a URL, submitted in an HTTP request from the client device 210 to the server 202. In this example, because the client device 210 received the function name in the form FG!#, that is the same string that the client device 210 will use in transmitting the request that identifies a user input into a field for such a function. However, the code injector and transcoder 208 will be watching transmissions from the client device 210 back to the server system 202 and will intercept the request. The code injector and transcoder 208 will apply the reverse transform than it applied to that string when it was serving the content, so that the ISP passes the string $#A through the Internet and back toward server system 202. Similarly, requests or function calls from the client device that are based on injected code will be intercepted by the code injector and transcoder 208. If the request or function call is from the execution of code that the code injector and transcoder 208 injected, then the code injector and transcoder 208 will perform the process or return the data associated with the request or function. If the request or function call is from the execution of code that the code injector and transcoder 204 injected or from the original code, then the code injector and transcoder 208 will pass that request along to the Internet 206.

Such transmission will be intercepted by code injector and transcoder 204, which will recognize the string as being one that it previously transcoded, and it will apply a reverse transformation to the string, changing the string from $#A to ABC. The code injector and transcoder 204 will then pass the string back to the server system 202. As a result, server system 202 can process the request as if nothing had occurred to the content during the transmission and return process. In instances where the transmission includes a request or function call from injected code from the code injector and transcoder 204, the code injector and transcoder 204 will process the request and return the appropriate data and deliver it to the code injector and transcoder 208 via the Internet 206.

In this manner, levels of security and countermeasures have been applied to the data transmission even though the code injector and transcoder 208 does not need to know about the code injector and transcoder 204, the code injector and transcoder 204 does not need to know about the code injector and transcoder 208 and can actually perform adequately without the second level of transcoding or code injection, and the server system 202 does not need to know about the code injector and transcoder 204 or the code injector and transcoder 208. Thus, for example, code injector and transcoder 204 can be easily added to a system that did not previously have such a form of security provided to it. Or, code injector and transcoder 204 may be used selectively with server 202—switched in or out of the flow into and out of server 202, and such turning on or off of the security feature need not affect the operation of server system 202. For example, the code injector and transcoder 204 may be used to add security to only a subset of URLs for a web site (e.g., pages with security concerns), or even pages that are ordinarily transcoded and have code injected can be left alone if the security system is under a present high processing load—where the unprotected page may be somewhat more vulnerable to manipulation, but anything malware learns because of a temporary lack of obfuscation can be overcome by regular polymorphic transformation down the road.

Figure 3:
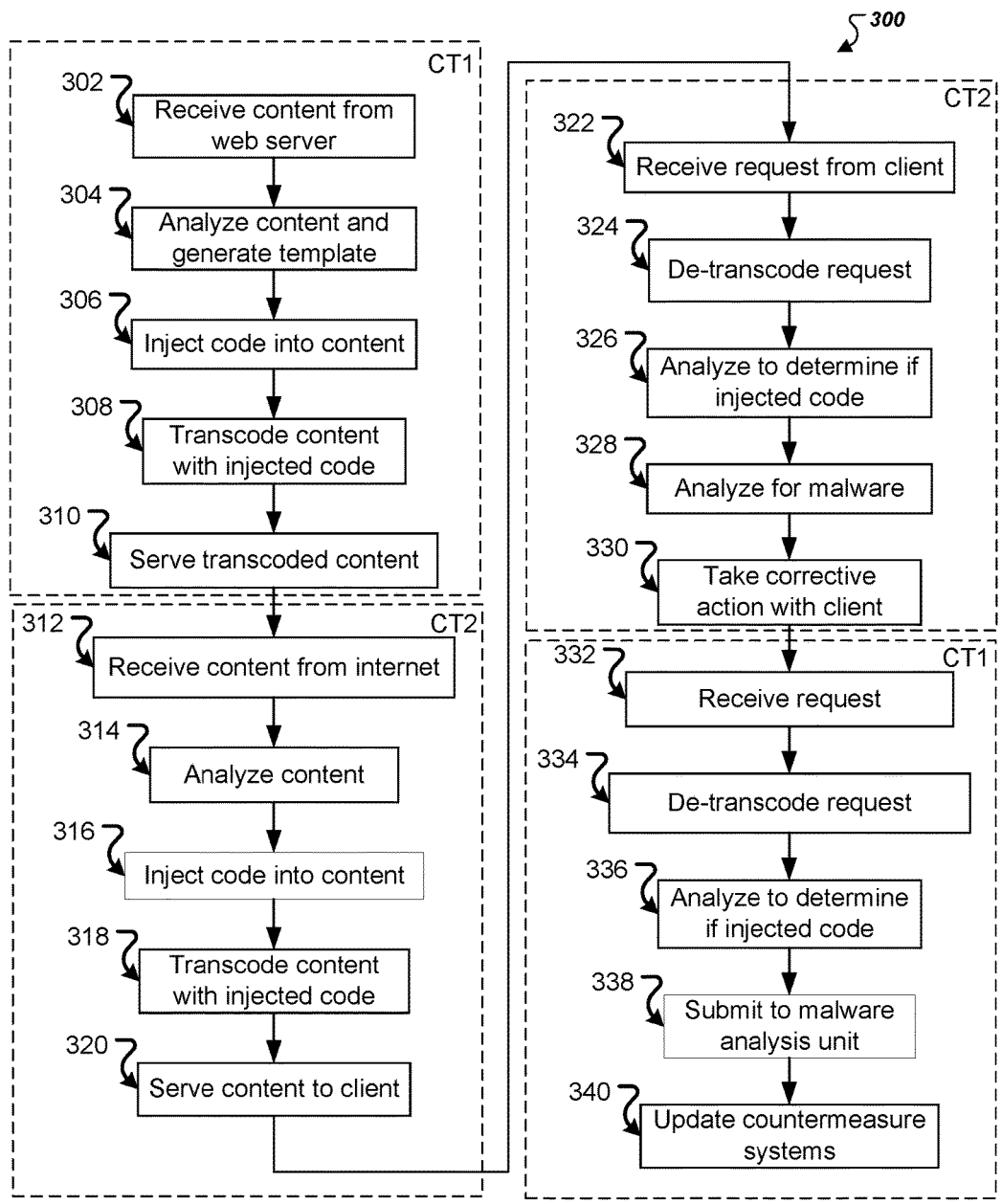
FIG. 3 is a flow chart showing multi-level polymorphic transcoding and code injection of served content and requests.

FIG. 3 is a flow chart showing multi-level polymorphic transcoding of served content and requests and code injection in the content and requests. The process shown here may be carried out by one or more security devices as described with respect to FIG. 1A, 1B, or 4.

In general, the process shows operations that may be performed by a pair of code injector and transcoders, CT1 and CT2, that are arranged in series with each other. The series arrangement may not be physical, but may instead be created by switching of data through the Internet. For example, a code injector and transcoder operated by a particular retailer may serve content to a number of different client devices and may periodically happen to serve to devices that are provided content by a particular ISP. In those particular situations, if the ISP operates the second code injector and transcoder, then the two code injector and transcoders will operate sequentially and stacked. In other instances where the retailer serves code to an ISP that does not have a code injector and transcoder, there will not be such sequential operation. Similarly, other retailers may not have code injector and transcoders, and an ISP may have a code injector and transcoder, so that the only transcoding or code injection will be on the client-side of the Internet rather than on the server side of the Internet.

The process begins a box 302, where the first code injector and transcoder (CT1) receives content from a Web server. Such content may be formatted in a variety of manners, and may include markup language content, stylesheet content, JavaScript or other executable program content, and a variety of other forms of content.

At box 304, CT1 analyzes the content and generates a template for it. For example, the analysis module in CT1 may identify particular elements in the code to be served that are amenable to transformation without affecting the manner in which the code presents to a user at a client device. As just one example, CT1 may form a template that points to the location of particular instances of those components, such as one pointer that points to every instance for a particular function name, and another pointer that points to all instances of a particular variable name or field name. CT1 may also identify points in the content where additional code may be inserted and not alter the execution of the content. CT1 may add those points to the template.

At box 306, CT1 injects code into the content. CT1 may inject code into the points in the content that were located in box 304. CT1 may inject code that when executed by a client device performs no operation. In some implementations, the injected code may perform operations that are invisible to the user such as identifying any malware that may be running on the client device. In some implementations, the injected code may execute when the portion of the content around or near the injected code is executed because of a request made by the user who is using the client device. In some implementations, the injection code that CT1 injects into the content may be different each time CT1 injects code. Also, the location where CT1 injects the code into the content may be different each time. CT1 may also inject instrumentation, or monitoring code, which may be in one or more files in addition to and separate from the files originally served, and may be programmed to execute on a client device to monitor the configuration of the client device, the manner in which a user interacts with the client device, and the way in which third-party software attempts to interact with the code that is served to the client device.

At box 308, CT1 transcodes the content using the template. For example, the template may indicate the presence of and locations throughout the served code of a particular variable name, and CT1 may select a random string to represent that variable name and then use the template to insert that random string at each instance where the variable name occurs in the content. CT1 may also transcode the injected code. At box 310, CT1 serves the transcoded content. For example, if CT1 is implemented as an intermediary between a server system and the Internet, CT1 may serve the transcoded content through the Internet to an IP address associated with the client device, and the content may be routed to an ISP for that client device.

At box 312, the second code injector and transcoder (CT2) receives the content from the Internet. At boxes 314 and 316, CT2 analyzes the content and injects code into the content. Such code injection may be similar to the analysis and code injection shown in boxes 304 and 306. CT2 may analyze and identify points in the content where code may be injected without altering the operation of the code. The points may be the same as those points identified by CT1, but will likely include additional points because of the addition of the injected code. The injected code may not necessarily be identical or even similar to the injection code from CT1, but should still not alter the operation of the code from the perspective of a user using the client device. CT2, like CT1, may also inject monitoring, or instrumentation, code.

At box 318, CT2 transcodes the content. For example, CT2 may also recognize the presence of the same function names and variable names, though in each instance the names will be different than they were originally. CT2 may identify locations in the content where injection code may be inserted. CT2 may itself select a random string to replace the particular random strings that were already replaced CT1, though CT2 may not need to recognize that the strings it is looking at were previously replaced (it just accepts them as being regular string values). If CT2 works according to the same algorithm as the first transcoder, it may end up replacing all of the same sorts of elements as the first transcoder did. However, CT2 may work by a different algorithm and may select different elements in the content to receive treatment for transcoding.

At box 320, CT2 serves the content to the client. Therefore, the client will receive content in which certain variable and function names have had their names changed once or twice from the names that they had when leaving the server system and has had two groups of code injection inserted. Such changes prevent malware from interacting with the code if the malware is attempting to make calls to the variables or functions using the names that the server had given them, because the malware was programmed by a malicious party looking at previous serving of code from the server system. The user of the client device may then interact with the served code in a variety of ordinary manners, such as by selecting objects in the code by clicking with a mouse, by filling out a web form, or performing other standard interactions with the code and the rendered webpage. The interaction by the user with the served code may cause the client device to execute some of the injection code.

At box 322, CT2 receives a request from the client device. For example, a user of the client device may have filled in a name and password on a form for obtaining credentials for logging in to a system operated by the company that runs the server system. The request may identify the field that the user filled in by employing a field name that was provided with the served code. The field name may have been recognized as a name that could be changed by CT1 and CT2, so that when the code was served to the client device, the field name had a random name assigned to it. As another example, the user of the client device may receive a request that involves injected code.

At box 324, CT2 de-transcodes the request. Such an action may involve identifying the presence of the field name that was previously trans-coded in identifying a need to perform a reverse transcoding on the name. CT2 may identify the transaction in various manners such as by cookie data sent by the client device, so that the reverse transcoding can occur in a manner that is inverse to the initial transcoding.

At box 326, CT2 analyzes the de-transcoded request to determine if the request involves injected code. A user may execute injected code unknowingly because the user interacted with the content in such a way to execute the code where the interjected code was intermingled. For example, the user may click on an area of a browser that causes a script to execute. If some injection code was injected into the script, then the request will likely involve injection code.

In addition, CT2 may analyze the request for an indication that malware is present on the client device, at box 328. For example, if the request includes a field name that does not match the code that CT2 served to the client device, the second transcoder may recognize that as an indication that code on the client devices interfered with the code that was served, such as malware attempting to fake a login or capture login information.

At box 330, CT2 takes corrective action with the client. For example software operating with the transcoder may be programmed to receive reports of anomalous activity from the transcoder and notify one or more personnel at the organization that operates the second transcoder. Such notification may occur as a message sent to an IT employee at the company, as a log of anomalous behavior, or in other relevant forms. Such employees may then take appropriate steps with respect to the anomalous behavior such as interpreting it, and if the interpretation indicates that there may be malware, then going to the physical machine and executing software on the machine to identify whether malware is present and to get rid of the malware.

At box 332, CT1 receives the de-transcoded request. In this example, the request will now include a name for the particular form field that matches a name that was in the code provided initially by CT1 or will include the injection code inserted by CT1. That name may have been a name that CT1 already transcoded to a random string of characters. At box 334, CT1 recognizes that the name has previously been transcoded, and it performs a reverse transcoding on the name, which in this example, involves generating a name that matches the name originally served for the field by the server system.

At box 336, CT1 analyzes the request to determine if the request corresponds to injected code. If the request corresponds to injected code, then CT1 may either return data to the client device that when executed does not perform an operation or data that performs an operation that is invisible to the user. An example operation that is invisible to the user may be malware detection.

At box 338, CT1 submits information to a malware analysis unit. For example, if the request included indications of anomalous behavior, such as an improper field name as discussed above, CT1, which may be operated by a very large organization that contracts with the security services company, may provide information back to the security services company for further analysis. For example, CT1 may provide information that characterizes the anomalous activity, including a URL for the content that was originally served, the field name in that content that was transcoded, the field name that was incorrect and submitted back to the first transcoder, an IP address associated with the serving of the code, configuration information about the device to which the code was served (e.g., make and model of the computer, the operating system type and version, and the browser type and version), and other parameters that may be helpful to the security analysis process.

At box 340, CT1 may update its countermeasure systems. For example, because CT1's organization subscribes with the security services company, the security services company may perform advanced analysis on the data it receives and may identify that current countermeasures have been caught up to by the particular malware threat. As a result, the security services company may automatically or manually generate new countermeasures and may push those countermeasures out to subscribers, as is shown by box 340, where CT1 is such a device that receives the new countermeasures and updates its operation automatically with the new countermeasures.

Figure 4:
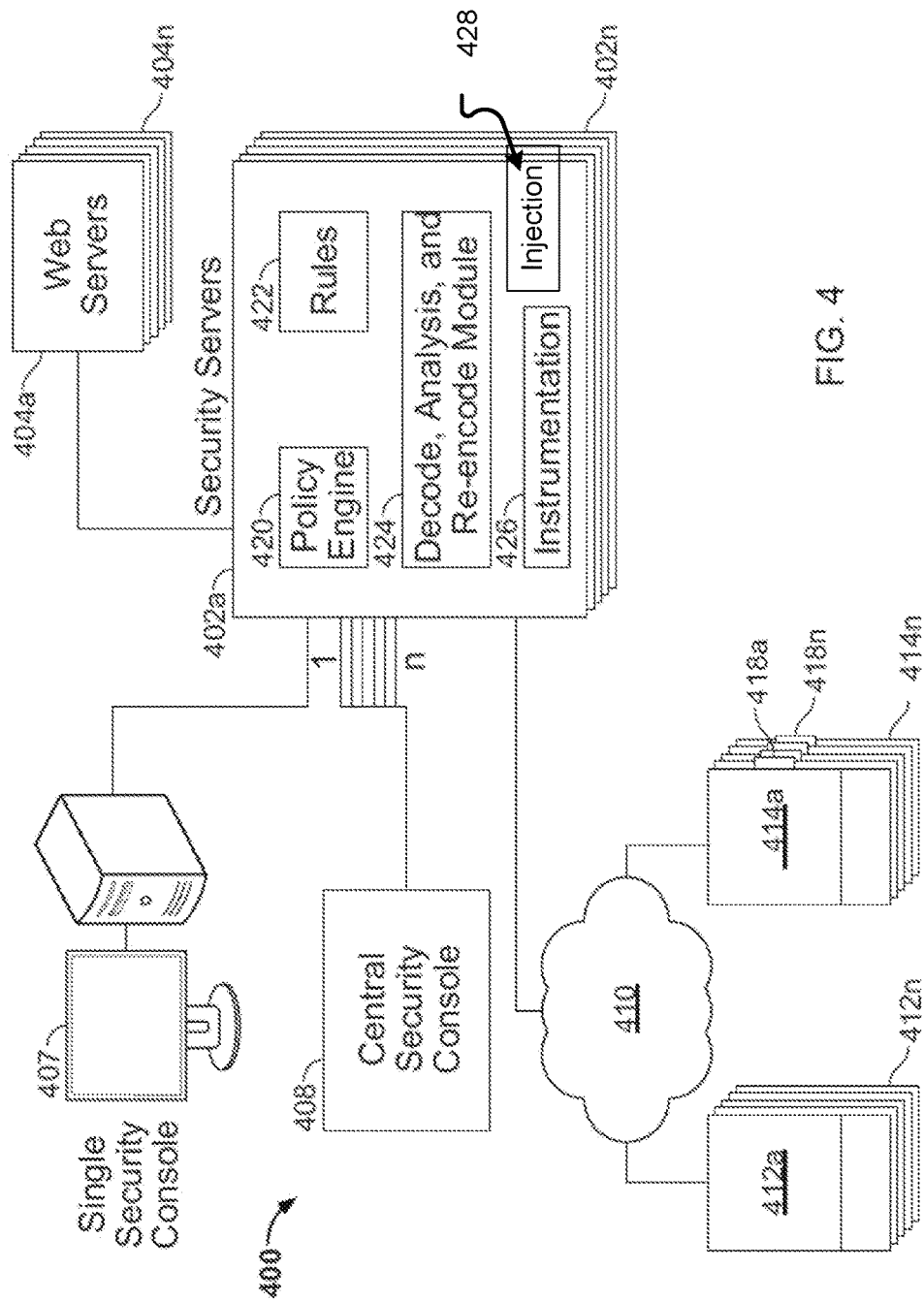
FIG. 4 shows a system for serving polymorphic and injection code.

FIG. 4 shows a system 400 for serving polymorphic and instrumented code. Generally, polymorphic code is code that is changed in different manners for different servings of the code in manners that do not affect the manner in which the executed code is perceived by users, so as to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device.

The system 400 may be similar to system 140 in FIG. 1B and may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 400 in this example is a system that is operated by or for a large number of different businesses that serve web pages and other content over the internet, such as banks and retailers that have online presences (e.g., on-line stores, or online account management tools). The main server systems operated by those organizations or their agents are designated as web servers 404a-404n, and could include a broad array of web servers, content servers, database servers, financial servers, load balancers, and other necessary components (either as physical or virtual servers).

In this example, security server systems 402a to 402n may cause code from the web server system to be supplemented and altered. In one example of the supplementation, code may be provided, either by the web server system itself as part of the originally-served code, or by another mechanism after the code is initially served, such as by the security server systems 402a to 402n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity. Multiple such systems may be implemented at a particular level in a network to provide greater processing bandwidth, or at different levels in a network, whether in a coordinated or uncoordinated manner, so as to introduce countermeasures at different locations (e.g., to plug holes or to provide even greater protection by applying stacked countermeasures).

The set of security server systems 402a to 402n is shown connected between the web servers 404a to 404n and a network 410 such as the internet. Although both extend to n in number, the actual number of sub-systems could vary. For example, certain of the customers could install two separate security server systems to serve all of their web server systems (which could be one or more), such as for redundancy purposes. The particular security server systems 402a-402n may be matched to particular ones of the web server systems 404a-404n, or they may be at separate sites, and all of the web servers for various different customers may be provided with services by a single common set of security servers 402a-402n (e.g., when all of the server systems are at a single co-location facility so that bandwidth issues are minimized).

Each of the security server systems 402a-402n may be arranged and programmed to carry out operations like those discussed above and below and other operations. For example, a policy engine 420 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters.

Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 402*a*-202*n*, such as by the security servers 402*a*-402*n* implementing a web crawler (not shown) to recursively search for new and changed content and to report such occurrences to the security servers 402*a*-402*n*, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 422 may store analytical rules for performing such analysis and for re-encoding of the content. The rules engine 422 may be populated with rules developed through operator observation of particular content types, such as by operators of a system studying typical web pages that call JavaScript content and recognizing that a particular method is frequently used in a particular manner. Such observation may result in the rules engine 422 being programmed to identify the method and calls to the method so that they can all be grouped and re-encoded in a consistent and coordinated manner.

The decode, analysis, and re-encode module 424 encodes content being passed to client computers from a web server according to relevant policies and rules. The module 424 also reverse encodes requests from the client computers to the relevant web server or servers. For example, a web page may be served with a particular parameter, and may refer to JavaScript that references that same parameter. The decode, analysis, and re-encode module 424 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 402 along with an identifier for the particular client computer so that the system 402 may know which key or function to apply, and may otherwise maintain a state for the client computer and its session. A stateless approach may also be employed, whereby the system 402 encrypts the state and stores it in a cookie that is saved at the relevant client computer, or in a hidden field such as a field on a form that is being presented to a user and for which the input to the form is being obfuscated in a polymorphic manner. The client computer may then pass that cookie data back when it passes the information that needs to be decoded back to its original status. With the cookie data, the system 402 may use a private key to decrypt the state information and use that state information in real-time to decode the information from the client computer. Such a stateless implementation may create benefits such as less management overhead for the server system 402 (e.g., for tracking state, for storing state, and for performing clean-up of stored state information as sessions time out or otherwise end) and as a result, higher overall throughput.

The decode, analysis, and re-encode module 404 and the security server system 402 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 424 may be adapted to apply different modifications to each instance of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated manner across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed. Where the content is recoded at multiple levels in a network, the first change may occur, and then a second change can be applied to the first-changed code. The algorithms for transcoding the code may be established so that, if they are run on the code sequentially, the code will still interoperate in the manner that it would have interoperated as it was originally served. In other words, changes made at one level will not confuse a device at another level into making changes that will appreciably affected the operation of the code.

Even where different modifications are applied in responding to multiple requests for a common web resource, the security server system 402 can apply the modifications in a manner that does not substantially affect a way that the user interacts with the resource, regardless of the different transformations applied. For example, when two different client computers request a common web page, the security server system 402 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 426 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 402 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 402, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 404a-404n, as encoded by decode, analysis, and re-encode module 424, may be rendered on web browsers of various client computers. Uninfected client computers 412a-412n represent computers that do not have malicious code programmed to interfere with a particular site a user visits or to otherwise perform malicious activity. Infected client computers 414a-414n represent computers that do have malware or malicious code (418a-418n, respectively) programmed to interfere with a particular site a user visits or to otherwise perform malicious activity. In certain implementations, the client computers 412a-412n, 414a-414n may also store the encrypted cookies discussed above and pass such cookies back through the network 410. The client computers 412a-212n, 414a-414n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 412a-412n, 414a-414n. For small-scale analysis, each web site operator may be provided with a single security console 407 that provides analytical tools for a single site or group of sites. For example, the console 407 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

An injection module 428 is programmed to insert injection code into the content that is served from a web server. The injection code is code that is inserted into a file that contains code originally from the servers 404a-404n. The injection module 428 may analyze the file to determine locations within the code of the file where injection code may be inserted so that when the code is executed by the client computers 412a-412n, 414a-414n, the injection code either does not perform an operations or performs an operation that is invisible to the user. An example of an operation that is invisible to the user may be searching one of the client computers 412a-412n, 414a-414n for malware.

The injection code module 428 may replace code, such as a script, in the file from the server with the injection code. To do so, the injection code module 428 may identify the functionality of a script and determine that the functionality of the script may be mimicked by the injection code. The injection code module 428 may also replace code that is not a script with a script that performs a similar operation. For example, the injection code module 428 may replace HTML with JavaScript.

Each time that the injection code module 428 replaces or injects code into a file from the server, the injection code module 428 may do so in a polymorphic manner. That is, the injection code module 428 may inject different code in a different location each time the injection code module 428 provides, to the client computers 412a-412n, 414a-414n, the same file from the server. The injection code module 428 may also work in tandem with the decode, analysis, and re-code module 424 such that code may be injected into a script and then the script and injection code are transcoded. This transcoding and injection may also be performed in a polymorphic manner. That is, the script and injection code may be transcoded in a different manner each time the content is provided to the client computers 412a-412n, 414a-414n.

The injection code module 428 may also continuously monitor the web server 404a-404n to determine if any of the content in which the injection code module 428 has inserted injection code into has changed. If the system detects a change in the content, then the injection code module 428 may reanalyze the content to determine if the point where the injection code was inserted will still provide execution that is transparent to a user. Alternatively, the injection code module 428 may compare the code with inserted injection code to the content that is stored on the server as one of the client computers 412a-412n executes the code. As the injection code module 428 receives a request from one of the client computers 412a-412n, the injection code module 428 may compare the request to the content stored on the server to ensure that the user experience is not different because of the injected code.

Console 407 may also be multiple different consoles used by different employees of an operator of the system 400, and may be used for pre-analysis of web content before it is served, as part of determining how best to apply polymorphic transformations to the web code. For example, in combined manual and automatic analysis, an operator at console 407 may form or apply rules 422 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions. Also, different organizations may have their own consoles at different levels of a network, and each such organization may receive reports relating to the execution of code that passed through their respective portions of the network, and they may be equipped with software that analyzes such reported data. For example, in a corporation, all devices may be mapped to physical locations, a security report may include an ID for a particular device, and an application may be run that automatically applies the ID to a mapping sub-application that reports through text and/or graphics where the device is physically located.

A central security console 408 may connect to a large number of web content providers, and may be run, for example, by an organization that provides the software for operating the security server systems 402*a*-402*n*. Such console 408 may access complex analytical and data analysis tools, such as tools that identify clustering of abnormal activities across thousands of client computers and sessions, so that an operator of the console 408 can focus on those clusters in order to diagnose them as malicious or benign, and then take steps to thwart any malicious activity.

In certain other implementations, the console 408 may have access to software for analyzing telemetry data received from a very large number of client computers that execute instrumentation code provided by the system 400. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 408 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 400, may be blocked from interaction, or may have their operators notified that their computer is potentially running malicious software (e.g., by sending an e-mail to an account holder of a computer so that the malicious software cannot intercept it easily).

Figure 5:
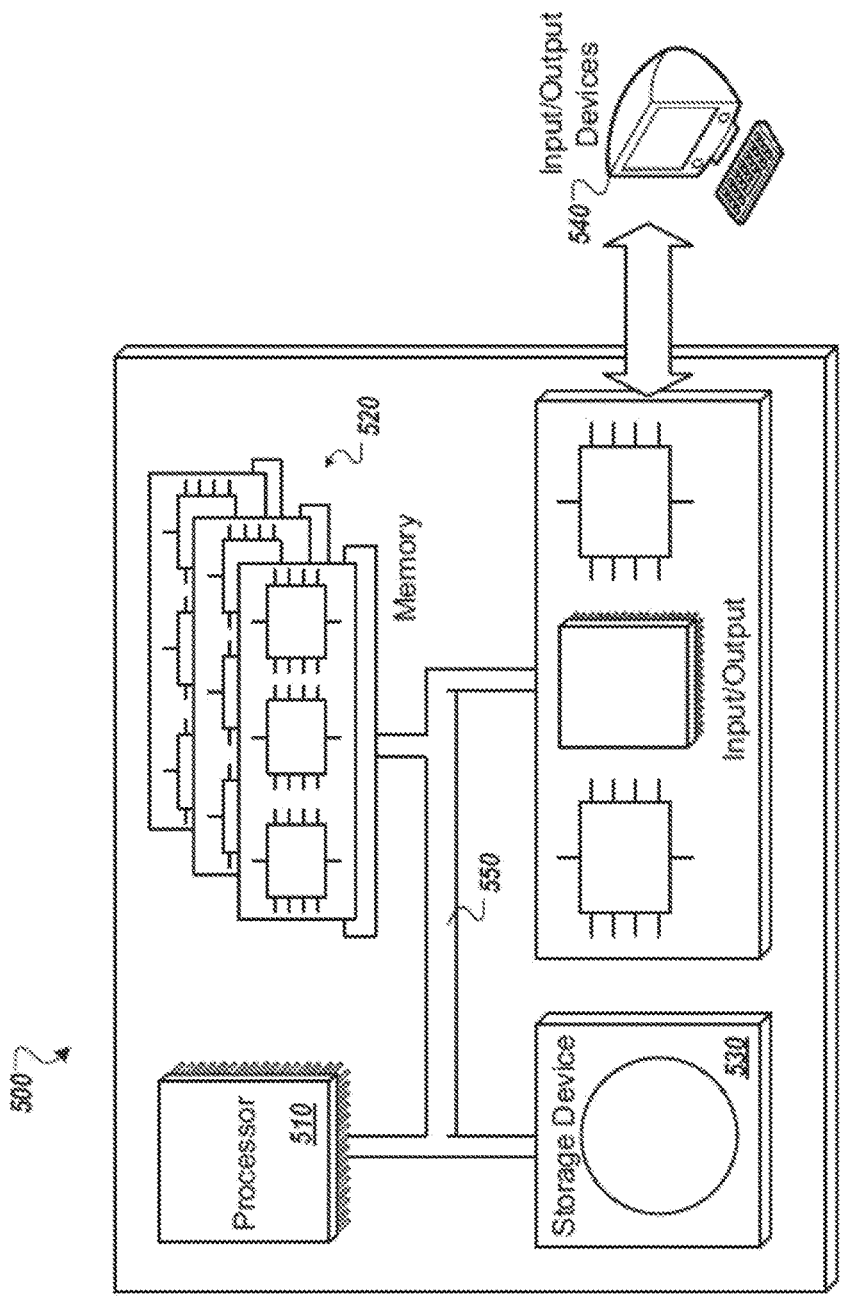
FIG. 5 shows an example computer system.

FIG. 5 shows an example of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at a computer security server system located between the Internet and a client computing device that makes requests over the Internet, a request, for content comprising main code executable at the client computing device, that is directed to a particular content server system;
forwarding, by the computer security server system, the request to the particular content server system;
obtaining executable injection code that, when inserted in the main code, does not alter, from a user's perspective, execution of the main code at the client computing device;
in response to the request, receiving, from the particular content server system, the main code;
identifying a plurality of locations in the main code where the executable injection code can be inserted into the main code such that the executable injection code is needed to perform the functionality of the main code without altering the execution of the main code from the user's perspective;
selecting a first set of one or more locations from the plurality of locations;
inserting into the main code, at the first set of one or more locations, the executable injection code such that the executed injection code is needed to perform the functionality of the main code without altering the execution of the main code from the user's perspective; and
after inserting the executable injection code, providing the main code to the client computing device.

2. The method of claim 1, wherein:
the main code is included in a file that is received from the particular content server system, and
inserting the executable injection code comprises inserting the executable injection code into the main code at multiple different locations of the first set of one or more locations separated by lines of the main code.

3. The method of claim 1, wherein the executable injection code, when executed with the main code by the client computing device, determines whether malicious software is executing at the client computing device by detecting consequences of the behavior of the execution of the malicious software at the client computing device.

4. The method of claim 1, wherein identifying the plurality of locations where the executable injection code can be inserted comprises
determining one or more locations within the received main code to insert the executable injection code for the executable injection code to not (i) alter, from the user's perspective, the execution of the received main code or (ii) perform actions observable by the user.

5. The method of claim 1, further comprising
renaming one or more variables or functions of the main code.

6. The method of claim 5, comprising:
receiving, from the client computing device, a request to execute a portion of the main code that corresponds to a renamed variable or function; and
based on receiving the request to execute a portion of the main code that corresponds to a renamed variable or function, determining the main code executing on the client computing device is not controlled by malware.

7. The method of claim 1, further comprising, in response to receiving a second request for the contend:
selecting a second set of one or more locations from the plurality of locations that are different than the first set of one or more locations;
inserting into the main code, at the second set of one or more locations, the executable injection code.

8. The method of claim 1, further comprising:
for each of multiple different servings in response to multiple different requests for the content, selecting a different set of one or more locations from the plurality of locations for inserting the executable injection code so as to interfere with malware on the client device that attempts to interact with the content, the main code, or both.

9. The method of claim 1, further comprising periodically updating a map that specifies the plurality of locations where the executable injection code can be inserted into the main code when served to a requesting client computing device.

10. The method of claim 9, further comprising detecting a change in the main code corresponding to the content, wherein updating the map is performed in response to detecting the change in the main code.

11. The method of claim 1, wherein the functionality of the main code comprises generating a web page with which a user can interact when the main code is executed at the client computing device.

12. A computer system comprising:
one or more hardware processors;
at least one memory coupled to the one or more hardware processors and storing one or more instructions which, when executed by the one or more hardware processors, cause the one or more hardware processors to:
receive, from a client computing device that makes requests over the Internet, a request, for content comprising main code executable at the client computing device, that is directed to a particular content server system;
forward the request to the particular content server system;
obtain executable injection code that, when inserted in the main code, does not alter, from a user's perspective, execution of the main code at the client computing device;
in response to the request, receive, from the particular content server system, the main code;
identify a plurality of locations in the main code where the executable injection code can be inserted into the main code such that the executable injection code is needed to perform the functionality of the main code without altering the execution of the main code from the user's perspective;
select a first set of one or more locations from the plurality of locations;
insert into the main code, at the first set of one or more locations, the executable injection code such that the executed injection code is needed to perform the functionality of the main code without altering the execution of the main code from the user's perspective; and
after inserting the executable injection code, provide the main code to the client computing device.

13. The computer system of claim 12, wherein the computer system is a computer security server system located between the Internet and the client computing device.

14. The computer system of claim 12, wherein:
the main code is included in a file that is received from the particular content server system, and
inserting the executable injection code comprises inserting the executable injection code into the main code at multiple different locations of the first set of one or more locations separated by lines of the main code.

15. The computer system of claim 12, wherein the executable injection code, when executed with the main code by the client computing device, determines whether malicious software is executing at the client computing device by detecting consequences of the behavior of the execution of the malicious software at the client computing device.

16. The computer system of claim 12, wherein identifying the plurality of locations where the executable injection code can be inserted comprises determining one or more locations within the received main code to insert the executable injection code for the executable injection code to not (i) alter, from the user's perspective, the execution of the received main code or (ii) perform actions observable by the user.

17. The computer system of claim 12, wherein the one or more instructions, when executed by the one or more hardware processors, cause the one or more hardware processors to:
rename one or more variables or functions of the main code.

18. The computer system of claim 17, wherein the one or more instructions, when executed by the one or more hardware processors, cause the one or more hardware processors to:
receive, from the client computing device, a request to execute a portion of the main code that corresponds to a renamed variable or function; and
based on receiving the request to execute a portion of the main code that corresponds to a renamed variable or function, determine the main code executing on the client computing device is not controlled by malware.

19. The computer system of claim 12, wherein the one or more instructions, when executed by the one or more hardware processors, cause the one or more hardware processors to, in response to receiving a second request for the content:
select a second set of one or more locations from the plurality of locations that are different than the first set of one or more locations; and insert into the main code, at the second set of one or more locations, the executable injection code.

20. The computer system of claim 12, wherein the one or more instructions, when executed by the one or more hardware processors, cause the one or more hardware processors to:

for each of multiple different servings in response to multiple different requests for the content, selecting a different set of one or more locations from the plurality of locations for inserting the executable injection code so as to interfere with malware on the client device that attempts to interact with the content, the main code, or both.

21. The computer system of claim 12, wherein the one or more instructions, when executed by the one or more hardware processors, cause the one or more hardware processors to:

periodically updating a map that specifies the plurality of locations where the executable injection code can be inserted into the main code when served to a requesting client computing device.

22. The computer system of claim 12, wherein the one or more instructions, when executed by the one or more hardware processors, cause the one or more hardware processors to:

detecting a change in the main code corresponding to the content, wherein updating the map is performed in response to detecting the change in the main code.

23. The computer system of claim 12, wherein the functionality of the main code comprises generating a web page with which a user can interact when the main code is executed at the client computing device.

* * * * *